United States Patent
Narayanam et al.

(10) Patent No.: US 11,816,069 B2
(45) Date of Patent: Nov. 14, 2023

(54) DATA DEDUPLICATION IN BLOCKCHAIN PLATFORMS

(71) Applicant: International Business Machines Corporation, Armonk, NY (US)

(72) Inventors: Krishnasuri Narayanam, Bangalore (IN); Ken Kumar, Meerut (IN); Akshar Kaul, Bangalore (IN); Pankaj S. Dayama, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/939,374

(22) Filed: Jul. 27, 2020

(65) Prior Publication Data

US 2022/0027319 A1    Jan. 27, 2022

(51) Int. Cl.
| | | |
|---|---|---|
| *G06F 16/17* | (2019.01) | |
| *G06F 16/27* | (2019.01) | |
| *H04L 67/10* | (2022.01) | |
| *H04L 9/06* | (2006.01) | |
| *G06F 16/174* | (2019.01) | |
| *H04L 67/104* | (2022.01) | |
| *H04L 9/00* | (2022.01) | |

(52) U.S. Cl.
CPC ........ *G06F 16/1748* (2019.01); *G06F 16/278* (2019.01); *H04L 9/0637* (2013.01); *H04L 67/1048* (2013.01); *H04L 9/50* (2022.05)

(58) Field of Classification Search
CPC . G06F 16/1748; G06F 16/278; H04L 9/0637; H04L 67/1048; H04L 2209/38
See application file for complete search history.

(56) References Cited

U.S. PATENT DOCUMENTS

| | | | |
|---|---|---|---|
| 8,402,250 B1 * | 3/2013 | Juillard | G06F 16/1824 711/216 |
| 10,037,337 B1 * | 7/2018 | Shanmuganathan | G06F 16/1752 |
| 10,275,176 B1 | 4/2019 | Gold et al. | |
| 10,296,258 B1 | 5/2019 | Richardson | |
| 10,310,760 B1 | 6/2019 | Dreier et al. | |
| 10,333,694 B1 * | 6/2019 | Hu | G06F 21/76 |
| 10,452,444 B1 | 10/2019 | Jibaja et al. | |
| 10,454,498 B1 | 10/2019 | Mao | |

(Continued)

FOREIGN PATENT DOCUMENTS

CN      110278076 A      9/2019

OTHER PUBLICATIONS

Arslan et al., "Compress-Store on Blockchain: A Decentralized Data Processing and Immutable Storage for Multimedia Streaming," arXiv:1905.10458v1, May 24, 2019, 7 pages, https://arxiv.org/pdf/1905.10458.pdf.

(Continued)

*Primary Examiner* — Hares Jami
(74) *Attorney, Agent, or Firm* — Grant Johnson

(57) ABSTRACT

A method for deduplicating a distributed ledger, a blockchain, and a computer program product. One embodiment may comprise splitting a new block on a distributed ledger into a plurality of partitions, comparing the plurality of partitions to a deduplication (dedup) map, replacing a first partition of the plurality of partitions with a first reference to the dedup map to produce a transformed block, and communicating the transformed block via a network interface to one or more peers.

20 Claims, 21 Drawing Sheets

(56) References Cited

U.S. PATENT DOCUMENTS

| | | | | |
|---|---|---|---|---|
| 10,708,040 | B1* | 7/2020 | Winarski | G06F 3/0614 |
| 2001/0037398 | A1* | 11/2001 | Chao | H04L 1/1887 |
| | | | | 709/214 |
| 2013/0086006 | A1* | 4/2013 | Colgrove | G06F 16/137 |
| | | | | 707/E17.005 |
| 2014/0188822 | A1* | 7/2014 | Das | H03M 7/3091 |
| | | | | 707/693 |
| 2020/0134621 | A1* | 4/2020 | Gupta | H04L 9/3239 |
| 2020/0336297 | A1* | 10/2020 | Zhuo | G06F 11/1076 |
| 2020/0412525 | A1* | 12/2020 | Katsak | G06F 16/1837 |

OTHER PUBLICATIONS

Jingyi Li et al., "Blockchain-Based Secure and Reliable Distributed Deduplication Scheme," Springer, International Conference on Algorithms and Architectures for Parallel Processing, Dec. 7, 2018, pp. 393-405, (Abstract Only), https://link.springer.com/chapter/10.1007/978-3-030-05051-1_27.

Androulaki, et al., "Hyperledger Fabric: A Distributed Operating System for Permissioned Blockchains," arXiv:1801.10228v2, Apr. 17, 2018, 15 pages, https://arxiv.org/pdf/1801.10228.pdf.

"Method and System for Reducing Storage Consumption using Virtual Storage Blocks and Block-Level Virtualization and Deduplication,", IP.com, An IP.com Prior Art Database Technical Disclosure, IP.com No. IPCOM000194381D, IP.com Electronic Publication Date: Mar. 22, 2010, 4 pages https://ip.com/IPCOM/000194381.

"Method to select file system deduplication mode for better resource optimization," IP.Com, An IP.com Prior Art Database Technical Disclosure, IP.com No. IPCOM000240416D, IP.com Electronic Publication Date: Jan. 29, 2015, 6 pages, https://ip.com/IPCOM/000240416.

"Method and System for Shared Memory Based Fast Block Dissemination in Blockchain networks," IP.com, An IP.com Prior Art Database Technical Disclosure, IP.com No. IPCOM000255145D, IP.com Electronic Publication Date: Sep. 4, 2018, 5 pages, https://ip.com/IPCOM/000255145.

Modesto, "Service-Oriented Information-Centric Vehicular Ad-hoc Networks," Thesis, University of Ottawa, 2019, 155 pages.

Chen et al., "Enabling Blockchain Applications Over Named Data Networking," Research Gate, May 2019, 16 pages, DOI: 10.1109/ICC.2019.8761919.

Mell et al., "The NIST Definition of Cloud Computing," Recommendations of the National Institute of Standards and Technology, U.S. Department of Commerce, Special Publication 800-145, Sep. 2011, 7 pages.

Marsalek et al., "Tackling Data Inefficiency: Compressing the Bitcoin Blockchain", 2019 18th IEEE International Conference On Trust, Security And Privacy In Computing And Communications/13th IEEE International Conference On Big Data Science And Engineering, pp. 626-633, DOI 10.1109/TrustCom/BigDataSE.2019.00089.

Singh, Jaspreet, "Understanding Data Deduplication", Druva, Blog, Jan. 9, 2009, 11 pp., <https://www.druva.com/blog/understanding-data-deduplication/>.

* cited by examiner

990

Block$_i$

Header 972$_i$

- Hash Value of Previous Block
- Reference Information

File(s) (and Metadata) 974$_i$

| Data 1 | REF 1 | Metadata 1 |
| Data 2 | REF 2 | Metadata 2 |
| . | . | . |
| . | . | . |
| . | . | . |
| Data N | REF N | Metadata N |

Value 976$_i$ (based on one or more of)

- New Hash Value of File
- New Storage Location of File
- New Metadata Assigned to File
- Transfer Access/Control to New Blockchain Participant
- New/Existing/Change of Ownership of the File

FIG. 9D

DATA DEDUPLICATION IN BLOCKCHAIN PLATFORMS

BACKGROUND

The present disclosure relates to blockchain networks, and more specifically, to reducing network load while transmitting transaction blocks in blockchain platforms.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One area where computing systems have been successfully applied is transaction processing. Historically, a centralized database stores and maintains transaction data in special-purpose database programs executing at one physical and logical location. This location is often a central computer, for example, a server computer or a mainframe computer. Centralized databases are relatively easy to maintain and manage, especially for purposes of security, because of their single point of control.

SUMMARY

According to embodiments of the present disclosure, a method for deduplicating a distributed ledger. One embodiment may comprise splitting a new block for a distributed ledger into a plurality of partitions, comparing the plurality of partitions to a deduplication (dedup) map, replacing a first partition of the plurality of partitions with a first reference to the dedup map to produce a transformed block, and communicating the transformed block via a network interface to one or more peers.

According to embodiments of the present disclosure, a blockchain. One embodiment may comprise an ordering service associated with a blockchain network, the blockchain network comprising a plurality of peer nodes. The ordering service may be adapted to perform a deduplication (dedup) method comprising splitting a new block on the blockchain into a plurality of partitions, comparing the plurality of partitions to a dedup map, replacing a first partition of the plurality of partitions with a reference index to the dedup map to produce a transformed block, and communicating the transformed block to the plurality of peer nodes in the blockchain.

According to embodiments of the present disclosure, a computer program product for data deduplication in a blockchain. One embodiment may comprise a computer readable storage medium having program instructions embodied therewith, the program instructions executable by a processor. The program instructions may to cause the processor to split a new block on a blockchain into a plurality of partitions, compare the plurality of partitions to a deduplication (dedup) map, replace a first partition of the plurality of partitions with a reference index to the dedup map to produce a transformed block, and communicate the transformed block via a network interface to one or more peers in the blockchain.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 9D illustrates a block which may represent the structure of blocks in the blockchain, according to example embodiments.

Figure 1:
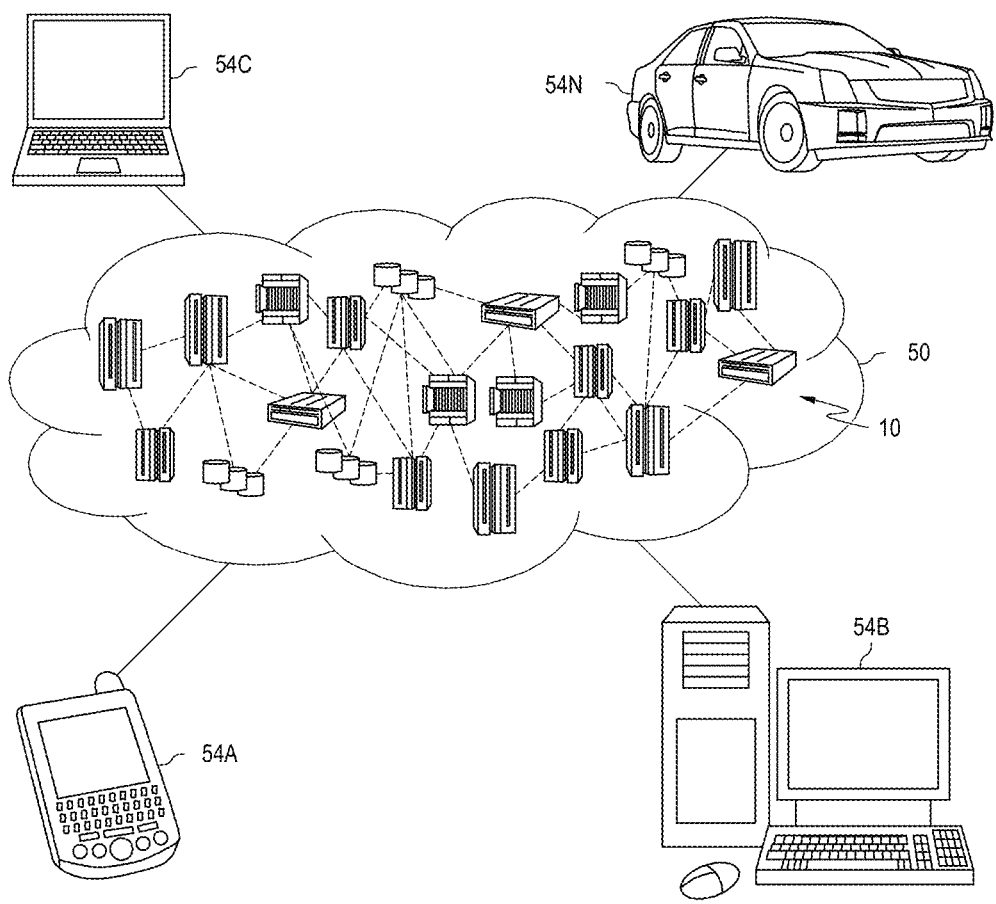
FIG. 1 depicts a cloud computing environment, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to blockchain networks, and more specifically, to reducing network load while transmitting transaction blocks in blockchain platforms. While the present disclosure is not necessarily limited to such applications, various aspects of the disclosure may be appreciated through a discussion of various examples using this context.

A decentralized database generally refers to a distributed storage system in which multiple nodes cooperate to store and/or provide access to the data. A blockchain is an example of a decentralized database, which generally includes an append-only immutable data structure resembling a distributed ledger, which is capable of maintaining records between parties without the necessity of mutual trust. The parties participating in the blockchain are generally referred to as peers.

In some blockchain embodiments, each peer maintains a copy of the distributed database records and no single peer can modify the distributed database records without a consensus being reached among the peers. In some blockchain embodiments, the peers may execute a consensus protocol to validate blockchain transactions, to group the blockchain transactions into blocks, and to build a hash chain over the blocks. This process may form the distributed ledger by ordering the storage transactions for consistency.

In public, or permission-less, blockchain embodiments, anyone can participate without specific authorization. Permissioned blockchain embodiments, in contrast, provide a system that can secure interactions among a group of authorized peers that share a common goal, but which still do not fully trust one another, such as businesses that exchange funds, goods, information, and the like.

Some blockchain embodiments may include programmable logic, tailored to the decentralized storage scheme, called "smart contracts" and "chaincodes." Smart contracts are trusted distributed applications that leverage the tamper-proof properties of the blockchain and an underlying agreement between nodes (often referred to as an endorsement or endorsement policy). In some embodiments, specialized chaincodes may exist for management functions and parameters, which are referred to as system chaincodes.

Blockchain transactions in some embodiments may be "endorsed" before being committed to the blockchain, while transactions that are not "endorsed" may be disregarded. An endorsement policy consistent with some embodiments allows chaincode to specify endorsers for a transaction in the form of a set of peer nodes that are necessary for endorsement. When a client sends the transaction to the peers specified in the endorsement policy, the transaction may be executed to validate the transaction. After validation, the transactions may enter an ordering phase in which a consensus protocol is used to produce an ordered sequence of endorsed transactions grouped into blocks.

In some blockchain embodiments, nodes may act as the communication entities of the blockchain system. A "node" in these embodiments may perform a logical function in the sense that multiple nodes of different types can run on the same physical server. Nodes may be grouped in trust domains and may be associated with logical entities that control them in various ways. Nodes may also include different types, such as a client or submitting-client node, which submits a transaction-invocation to an endorser (e.g., peer), and ordering nodes, which broadcast transaction-proposals to an ordering service. Yet another type of node is a peer node, which can receive client submitted transactions, commit the transactions, and maintain a state and a copy of the ledger of blockchain transactions. Peer nodes in some embodiments may also have the role of an endorser, although it is not a requirement.

The ordering-service-node (orderer) in some embodiments may manage the communication service for all nodes and may implement a delivery guarantee, such as a broadcast to each of the peer nodes in the system when committing transactions and modifying a world state of the blockchain. In some embodiments, this world state may include an initial blockchain transaction, which normally comprises control and setup information.

In some embodiments, the distributed ledger may be a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction, in turn, may result in a set of asset key-value pairs being committed to the distributed ledger as one or more operands, such as creates, updates, deletes, and the like. The distributed ledger may include a blockchain (also referred to as a chain), which is used to store the immutable, sequenced record in blocks. The distributed ledger may also include a state database, which maintains a current state of the blockchain. Some embodiments use one distributed ledger per channel, but other embodiments are possible. Each peer node in these embodiments maintains a copy of the distributed ledger for each channel of which they are a member.

The chain in some embodiments may comprise a transaction log, which may be structured as hash-linked blocks, and each block contains a sequence of N transactions where N is equal to or greater than one. The block header may include a hash of the block's transactions, as well as a hash of the prior block's header. In this way, all transactions on the ledger may be sequenced and cryptographically linked together. Accordingly, it is not reasonably possible to tamper with the ledger data without breaking the hash links in these embodiments. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The Hyperledger® Fabric project (Hyperledger), hosted by The Linux Foundation, is an open source, enterprise-grade permissioned distributed ledger technology platform. Hyperledger implementations may include several significant features, including an execute-order-validate architecture for new architecture for transactions and two crash fault tolerant ordering service implementations: Raft and Kafka. Hyperledger technology may also act as universal blockchain architecture that any industry or public domain can adopt, with the assurance that its networks will be interoperable across market, regulatory and geographic boundaries.

Many distributed ledger protocols, including Hyperledger, utilize a large number of messages to coordinate among the participating members, and hence, network traffic may pose a major bottleneck in the scalability of such systems. Moreover, when a new peer decides to join the blockchain network (or recovers after a crash), the new peer typically needs to receive all the previous blocks in the blockchain before it can start participating in the network. Sending all of the previous blocks to a new peer may create an enormous stress on the network bandwidth, and optimizing such protocols can provide significant performance advantages.

Accordingly, some aspects of this disclosure may include a method, system, computer program product to reduce the data traffic of a blockchain network by eliminating duplicate copies of repeating data before transmission of the block and/or blocks. In particular, some embodiments may utilize a source based, sub file based, fixed length data segment/partition data dedup method to reduce the size of blocks before transmission. Some embodiments may further include an ordering service that maintains a dedup map. After establishing consensus on the order of transactions and cutting a transaction block, the ordering service may split the transaction block into a predefined configurable number of partitions.

Next, the ordering service may compare each partition to a deduplication (dedup) map, replace each partition in the dedup map with the appropriate partition indicator/label, and then broadcast the transformed block to peers. The ordering service may also update the dedup map with any new partitions, and also send the updates to the peers. In this way, instead of sending the whole original block on the network, the ordering service only sends a transformed block containing the new data partitions along with indicators/labels to the old partitions. The peers, in turn, upon receiving the broadcast, may reconstruct the original block from the dedup map, and then add the original block to the distributed ledger.

Because the transformed transaction block is smaller in size when compared to the actual/original transaction block, two direct savings are possible in some embodiments. First, some embodiments may provide a significant reduction in the amount of central processing unit (CPU) and/or input-output (TO) adapter resources needed to transfer the transformed block. Second, the lesser amounts of data required to be transferred over the network may improve network bandwidth use and may lead to faster data transfer in some embodiments. This, in turn, may improve the blockchain's overall transaction lag, particularly in the environments where network delays are a major bottleneck.

Some embodiments may also allow the amount of savings on the network to be increased or decreased depending on a configurable size of the dedup map (i.e., support for configurable dedup ratios). For example, in an embodiment, the data dedup map might only consider the data partitions that belong to only the recent "k" ledger blocks, where the parameter "k" is configurable and/or dynamically adjustable. Partitions in the dedup map that are outside the most recent "k" ledger blocks, in turn, may be automatically deleted using time stamps, blockchain block numbers, or the like. Other embodiments may provide for a fixed size of the data duplication map, and may automatically delete references for the oldest partitions, the least frequently used partitions, etc.

Some embodiment of the disclosure may be advantageously used to accelerate peer boot-up. When a new peer joins the network and/or when a crashed peer reboots in some embodiments, that peer may request that it be brought up to date in the blockchain. In the case of a new peer, this includes requesting all of the previously-accepted blocks in that blockchain. In the case of a crashed peer, this may include all of the blocks accepted since the crash. In some embodiments, peers newly joining the blockchain network and/or crashed peers may receive those blocks from one or more of the other peers in the network using a gossip protocol. One feature and advantage of these embodiments is that it may not be necessary for the orderer to support deduplication, rather the peers sending the ledger blocks only can construct the dedup map using the blocks on the shared ledger and communicate with the new or crashed peers.

In some embodiments, the responding peer may begin sending the blocks as it received the blocks (e.g., by recomputing the dedup map appropriate for that block in the blockchain). The new peer in these embodiments may store the first block and may start maintaining the dedup map. Now for the future blocks, the new peer may receive the partition indicators for the already seen partitions and data for the partition which was seen for the first time when that particular block was broadcasted, along with the updates to the map. In this way, the new peer reaches the current world state of the blocks as well as the map. In other embodiments, the responding peer may transmit a current copy of the dedup map to the new peer along (which the peer itself received from the ordering service) with blocks transformed according to the current dedup map.

Some embodiments may maintain the data dedup map at multiple dedup levels (e.g., by using differently sized dedup maps) simultaneously to achieve different objectives. For example, the ordering service might be performing data deduplication with a certain dedup ratio with the goal of achieving savings in the network data transfer time, while ensuring not getting into computational bottleneck due to creating in the dedup map and/or not requiring excessive memory use. The peer nodes of the organizations (or just the anchor peer of each organization), in turn, may be performing data deduplication with a much higher dedup ratio with the objective of ensuring faster peer boot-up.

Some of these embodiments may further optimize the compression levels, including the multiple compression levels, by: (i) monitoring the performance of the blockchain network (e.g., parameters like transaction throughput, usage of CPU, memory & network performance, transaction processing times, etc.) for a given dedup ratio and dedup page/partition size; and then (ii) recommending optimized values for these parameters, using linear programming, stochastic optimization, artificial intelligence models, or the like. These optimized values may then be further used to enable data deduplication in similar/related blockchain environments for any new blockchain network to achieve better performance.

Some embodiments of this disclosure may also be used to accelerate encrypted block transfer over a network. For example, data deduplication embodiments that are agnostic to the type/content/format of data that is being transferred over the network may be advantageously used in scenarios where the blocks are encrypted before being transmitted over the network because the encryption algorithms and/or hardware will have to encrypt/decrypt less data and because encryption/decryption processing times typically correlate strongly with data size. Similarly, because encryption/decryption algorithms are typically some of the most computationally intensive portions of an overall process, this reduction may significantly improve the process's end-to-end turnaround time. Moreover, some embodiments may reduce data redundancy (in addition to size) during deduplication, and thus, make the overall encryption/decryption process more secure.

One feature and advantage of some embodiments is that data dedup occurs before data transmission. This feature and advantage may be desirable because it may reduce demand for network bandwidth, which in turn, may result in less network congestion and quicker peer-startup and/or recovery times.

Another feature and advantage of some embodiments is that they do not affect the workflows of the blockchain protocol and do not require any special hardware. As a result, these embodiments may be implemented as a library usable by a wide variety of different blockchain implementations and protocols. Similarly, some embodiments of the disclosure may be adapted to deduplicate existing blocks in the blockchain that are properly formatted according to whatever protocol exists for the blockchain. That is, they may be applied to live/existing blockchains without losing the transaction history encoded in those chains.

Another feature and advantage of some embodiments is that, because these embodiments do not interfere with any of the blockchain protocols and because these embodiments are using a deterministic dedup method, such as those described with reference to FIGS. 4-6, these embodiments can be easily run by any of the peers (even the anchor peer) before sending the transaction blocks to the new/recovering peer and prevent network congestion. The peers of any organization (or just the anchor peer) might create the dedup map locally from the ledger, and keep the dedup map available readily so that transformed dedup blocks could be communicated to any peer booting up, instead of sending the original transaction blocks.

Some embodiments may also be desirable because they do not need to handle writes and updates to the deduped data partitions. Instead, these embodiments only need to handle reads on the deduped partitions. There may be significant performance impact in applications where writes to the deduped partitions are involved because that action triggers a copy-on-write of deduped partitions. Additionally, some embodiments described may not suffer from such issues because there are no writes involved. Additionally, the CPU overhead with only reads on the deduped data partitions is minimal in many applications, and this CPU overhead may be offset, in whole or in part, by the following savings: a) a reduction in the amount of CPU needed to transfer the transformed block, particularly with increased dedup ratios; b) less data transfer over the network, resulting in network bandwidth savings; c) dedup may be performed entirely by the ordering service in some embodiments, therefore no overhead on the peers of the blockchain network; d) the dedup map construction may not be an overhead on the ordering service (which, itself, maybe a cluster of DPS nodes 300) because there is no need to update the deduped data partitions, CPU power & RAM available with the ordering service is generally very high, and the gradual reduction in the CPU cost over time.

Some embodiments may be desirable because they enable data deduplication at multiple hierarchies to achieve different objectives (e.g., dedup by orderer for reducing the network load, dedup by anchor peers with higher dedup ratios for accelerated boot-up of new peers/rebooting of crashed peers). Additionally, some embodiments may be desirable because they can recommend configuration parameters (e.g., dedup data block/partition size, dedup ratio at different levels, etc.) suitable for a given blockchain network environment by learning and responding to the performance details from other blockchain network elements and environments.

Cloud Computing

FIG. 1 illustrates a cloud environment, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
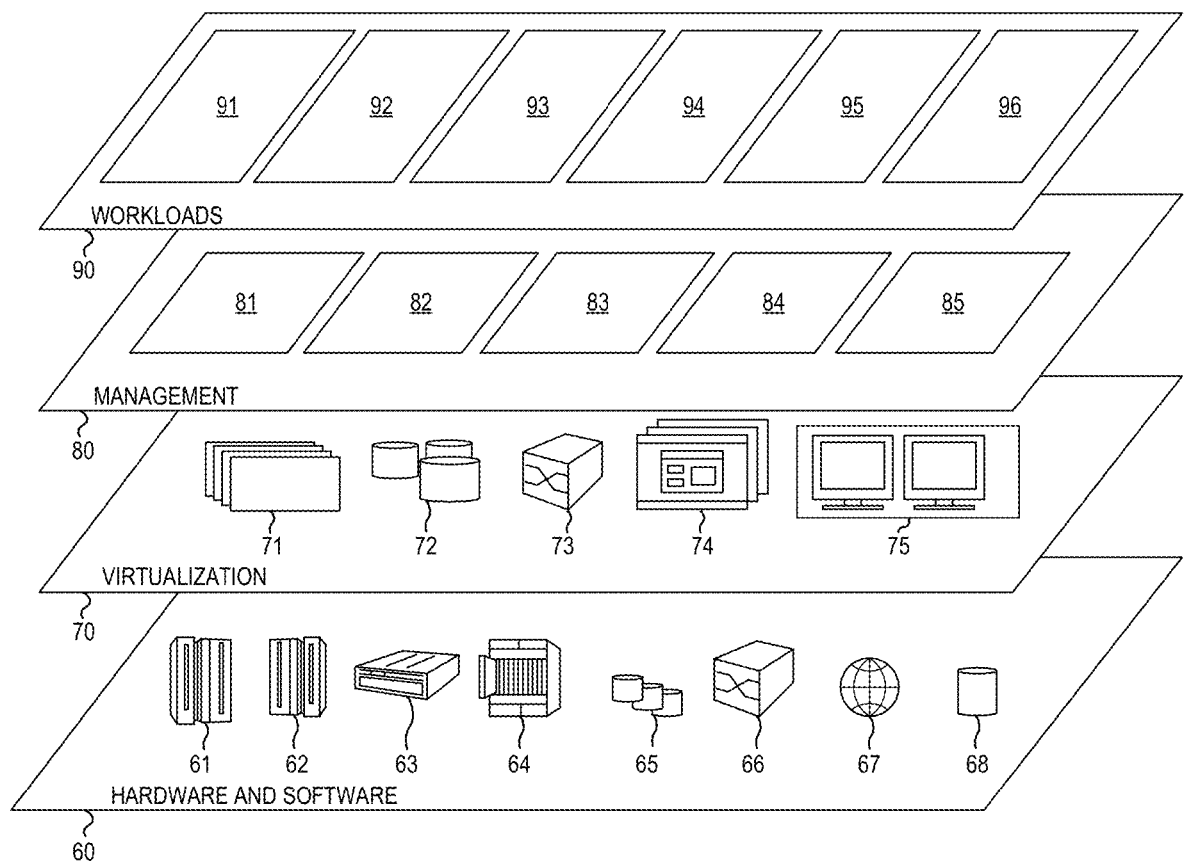
FIG. 2 depicts abstraction model layers, consistent with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and blockchain node 96.

Data Processing System

Figure 3:
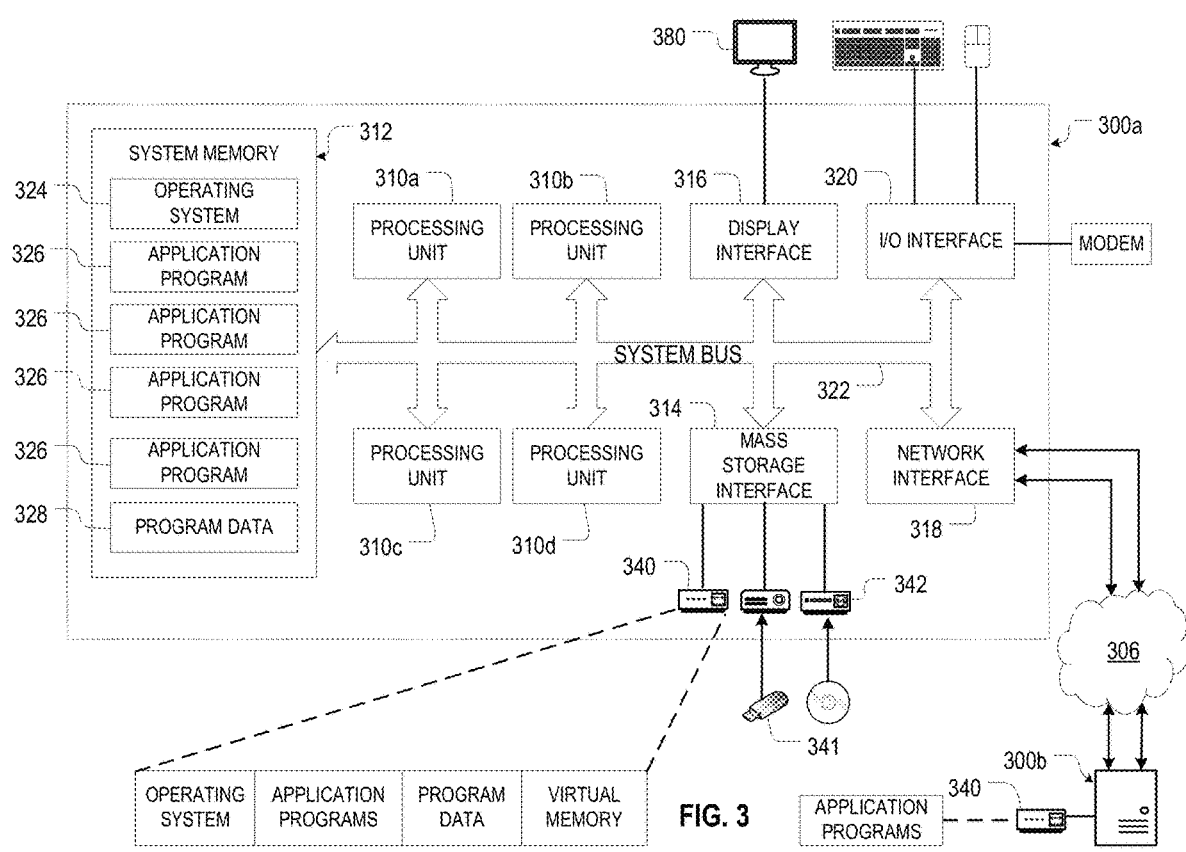
FIG. 3 depicts a data processing system, consistent with some embodiments.

FIG. 3 illustrates an embodiment of a data processing system (DPS) 300 suitable for use as a cloud computing node 10 in a cloud computing environment 50, consistent with some embodiments. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 comprises a plurality of central processing units 310 $a$-310 $d$ (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340, universal serial bus ("USB") storage device 341, or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multiprocessor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 341, 342, which are in communication with the processors 310 through the system bus 322. The program code in the different embodiments may be embodied on different physical or tangible computer readable media, such as the system memory 312 or the mass storage devices 340, 341, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 341, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 341, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interfaces 314, 316, 318, 320 support communication with a variety of storage and I/O devices. The mass storage interface 314 supports the attachment of one or more mass storage devices 340, 341, 342, which are typically rotating magnetic disk drive storage devices, a solid-state storage device (SSD) that uses integrated circuit assemblies as memory to store data persistently, typically using flash memory, or a combination of the two. However, the mass storage devices 340, 341, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and customers to communicate with the DPS 300. Note, however, that while the display interface 316 is provided to support communication with one or more display units 380, the computer systems 300 does not necessarily require a display unit 380 because all needed interaction with customers and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

Block Transformation

Figure 4A:
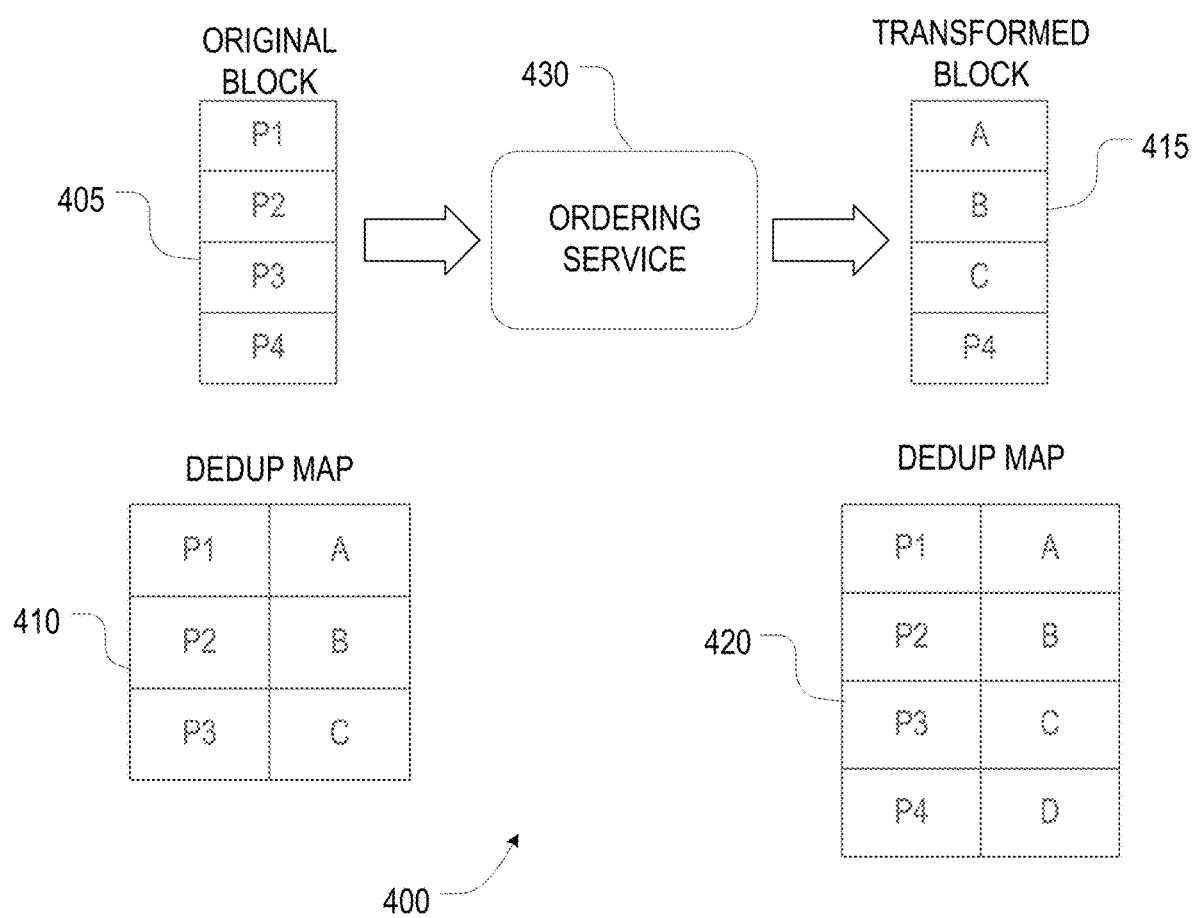
FIGS. 4A and 4B are a diagram of system blocks and maps and a flowchart illustrating one process of deduplicating data in a blockchain at an ordering service, consistent with some embodiments.
Figure 4B:
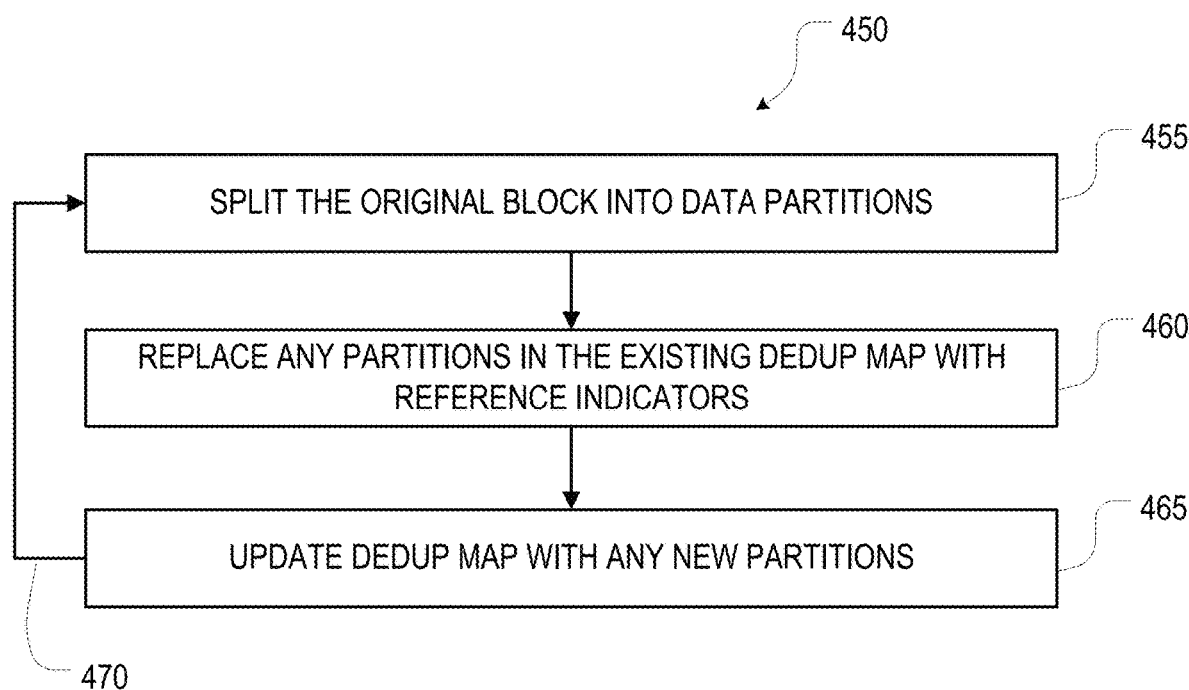

FIGS. 4A and 4B are a diagram of system blocks and maps 400 and a flowchart illustrating one process 450 of deduplicating data in a blockchain at an ordering service 430, consistent with some embodiments. FIG. 4A includes an original block of transactions 405 (original block), an original/preexisting data dedup map 410, a transformed block of transactions 415 (transformed block), and an updated data dedup map 420. The ordering service 430 may split the original block 405 into a plurality of data partitions P1, P2, P3, and P4. The preexisting data dedup map 410 may containing reference indicators A, B, and C for previously received/processed data payloads P1, P2, and P3, respectively.

To create the transformed block 415, the ordering service 430 in this embodiment may replace the data partitions P1, P2 and P3 with the reference indicators A, B, and C from the preexisting data dedup map 410. However, the ordering service 430 may not replace partition P4 data since the ordering service 430 is seeing that data for the first time (i.e., corresponding data does not exist in the preexisting data dedup map 410). Instead, the data partition P4 data is both left in the transformed block 415 and added to the data dedup map to create the updated data dedup map 420.

Referring now to FIG. 4B, at operation 455, the ordering service 430 may split the original block 405 into data partitions P1, P2, P3 and P4. Four data partitions are depicted in FIG. 4A for clarity, but other embodiments may use different numbers of partitions. At operation 460, the ordering service 430 may execute a dedup map method to replace any partitions in the existing dedup map 410 with reference indicators. In this illustrative example, the ordering service 430 may replace the first three partitions with reference indicators A, B, and C. In this way, the block 405 is converted into a significantly smaller transformed block 415. Because the P4 partition did not exist in the original dedup map 410, the ordering service 430 in this embodiment does not change the data in the P4 partition, but instead, updates the dedup map with this new partition at operation 465 so that, if a new block (not shown) arrives with the same data for any partition P1, P2, P3, P4, the ordering service 430 may simply replace it with the reference indicator A, B, C, or D. At flow marker 470, the ordering service may repeat operations 455-465 on a subsequent block in the blockchain.

Figure 5A:
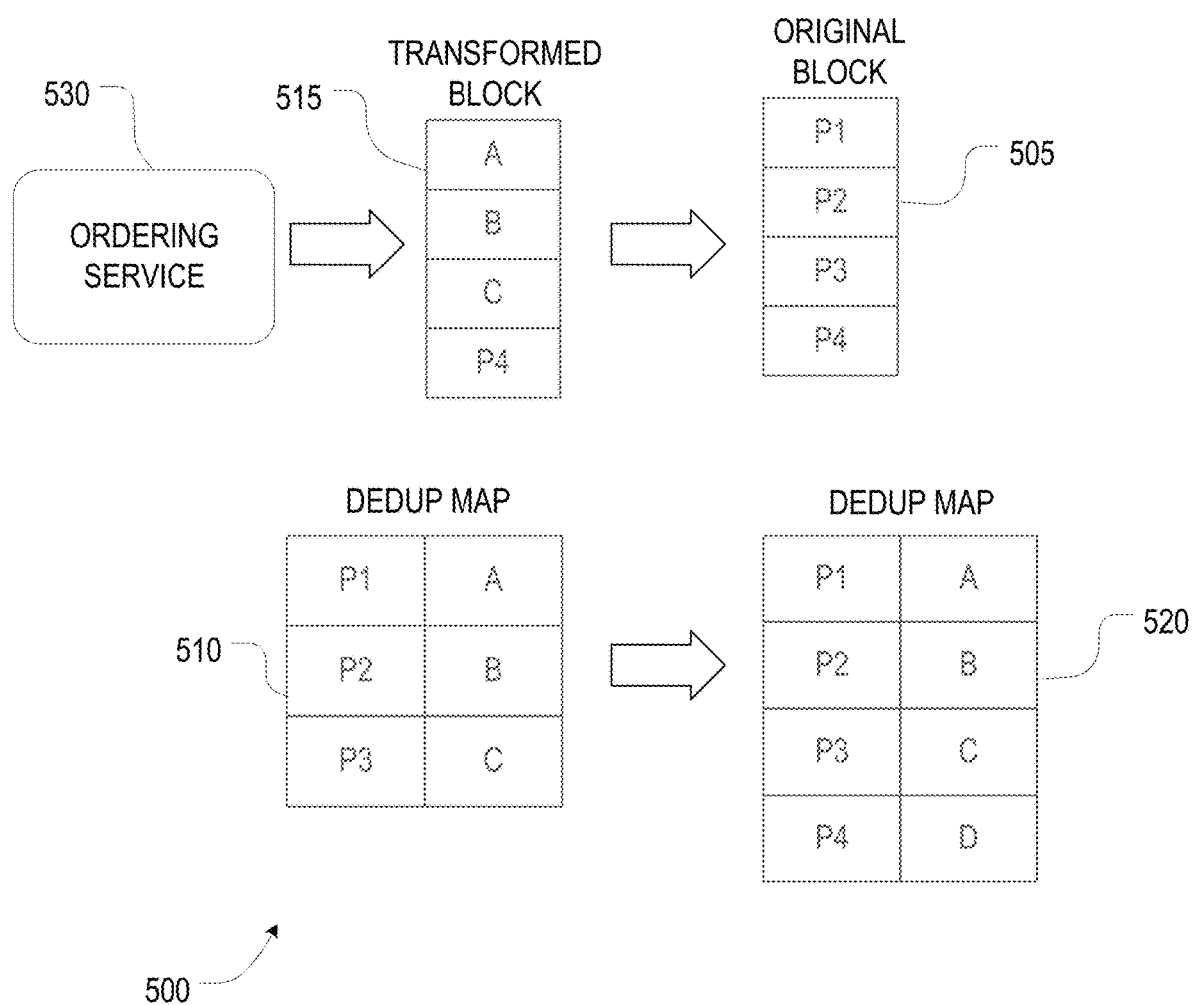
FIGS. 5A and 5B are a system diagram and a flowchart illustrating one method of deduplicating data in a blockchain performed at a peer node, consistent with some embodiments.
Figure 5B:
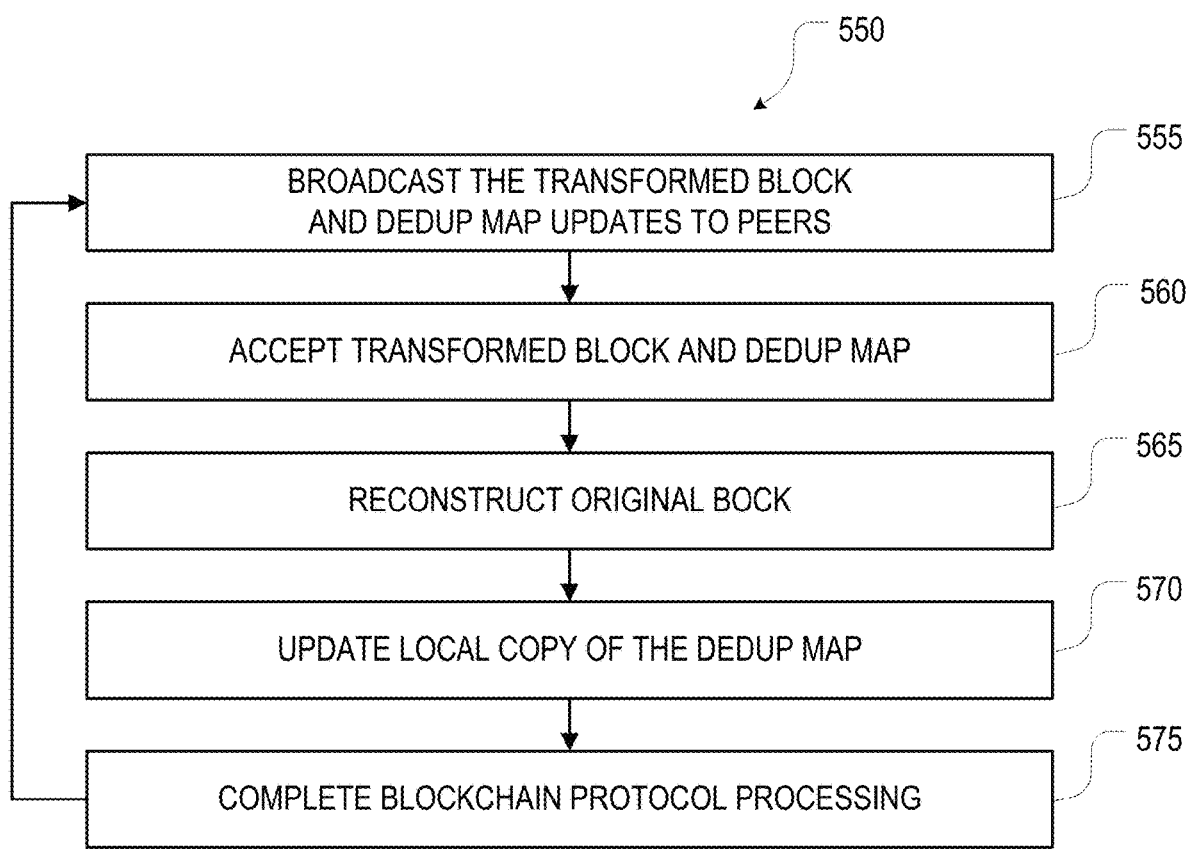

FIGS. 5A and 5B are a system diagram 500 and a flowchart 550 illustrating one method of deduplicating data in a blockchain performed at a peer node 525, consistent with some embodiments. FIG. 5A includes an original bock of transactions 505 (original block), a preexisting data dedup map 510, a transformed block of transactions 515 (transformed block), and an updated data dedup map 520. In FIG. 5A, the ordering service 530 has previous split the original block 505 into a plurality of data partitions P1, P2, P3, and P4, and replaced the data for P1, P2, and P3 with reference indicators A, B, and C, and then broadcasts the transformed block 515 along with updates to the dedup map to all the peers over the network. The preexisting data dedup map 510 at the peer node may be containing reference indicators A, B, and C for previously received/processed data payloads P1, P2, and P3, respectively. Each peer may reconstruct the original block 505 from the transformed block 515 using the dedup map 510, then may add the reconstructed new block to the blockchain ledger, and then may update its copy of the data dedup map with the P4 update to create the updated data dedup map 520. One feature and advantage of some embodiments is the old dedup map may be sufficient to reconstruct the block.

Referring now to FIG. 5B, the ordering service 530 may broadcast the new transformed block 515 with indicators A, B, C and the P4 partition to all of the peers at operation 555. Optionally, some embodiments may also broadcast a dedup map update containing the P4 partition. The peers may accept the new transformed block 515 at operation 560 (and, optionally, the dedup map update), and then reconstruct the original block 505 at operation 565. Next, the peers may use the P4 partition or dedup map update to update their local copy of the dedup map 510 to the updated dedup map 520 at operation 570. The peers may then follow the remaining blockchain protocols (if any) at operation 575. The peer may repeat operations 555-575 on a subsequent block in the blockchain.

Figure 6A:
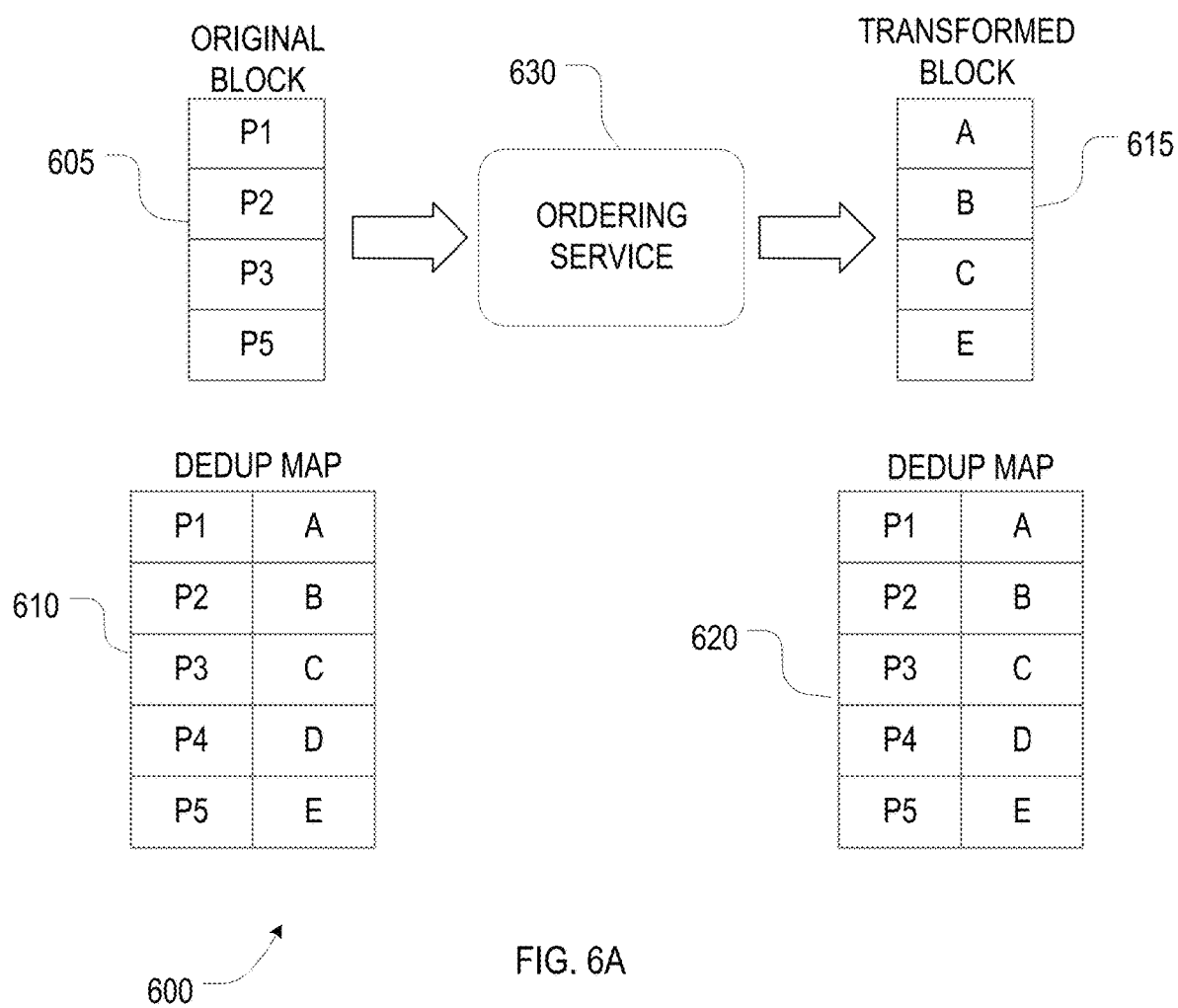
FIGS. 6A and 6B are a system diagram and a flowchart illustrating the method in FIGS. 4A-4B as applied to a subsequent block in the blockchain, consistent with some embodiments.
Figure 6B:
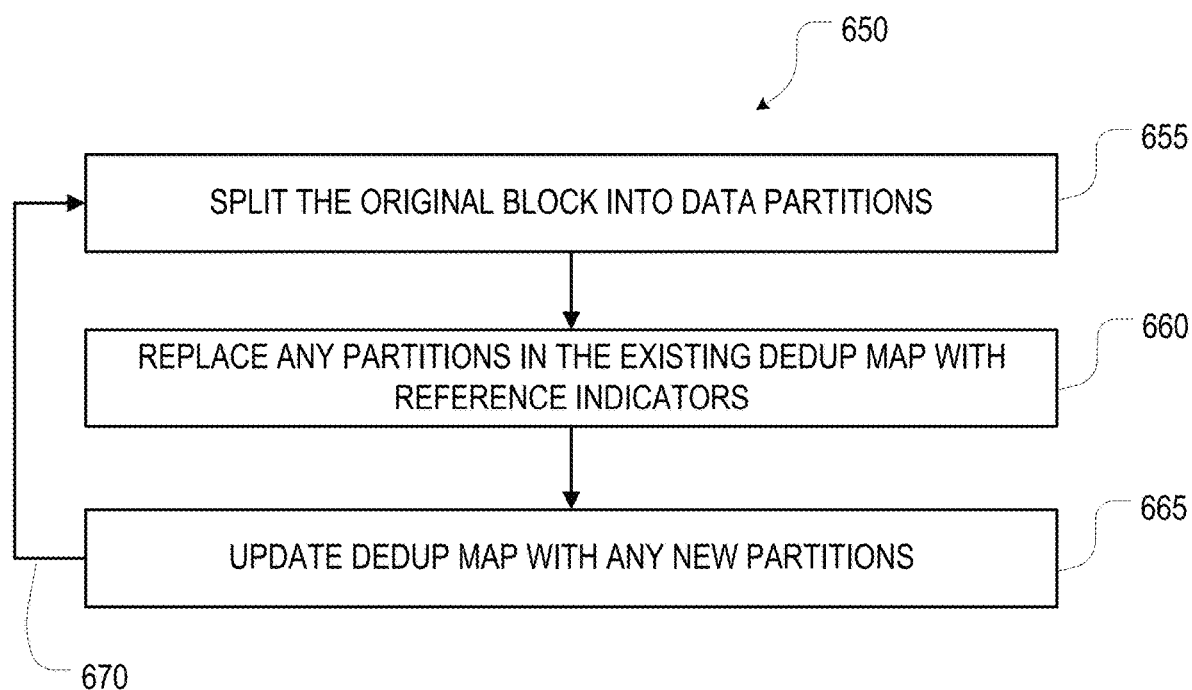

FIGS. 6A and 6B are a system diagram 600 and a flowchart 650 illustrating the method in FIGS. 4A-4B as applied to a subsequent block in the blockchain, consistent with some embodiments. In FIG. 6A, the ordering service 630 may still split the subsequent block 605 into a plurality of data partitions P1, P2, P3, and P5. In this scenario, however, the preexisting data dedup map 610 may already contain reference indicators A, B, C, D, and E for previously received/processed data payloads P1, P2, P3, P4, and P5, respectively. Accordingly, in the scenario in FIGS. 6A and 6B, the ordering service 630 may replace the data partitions P1, P2, P3, and P5 with the reference indicators A, B, C, and E from the preexisting data dedup map 610 to create the transformed block 615. That is, only the reference indicators A, B, C, and E are transmitted over the network in this scenario, and none of the partitions P1, P2, P3, or P5.

Referring now to FIG. 6B, after cutting a new block of transactions 605, the ordering service 630 may split the new block 605 into data partitions at operation 655. The ordering service 630 may then execute the dedup map method at operation 660 to replace all the partitions in the dedup map 610 with their corresponding indicators. In this example, because the ordering service 630 has previously seen all the data partitions P1, P2, P3, and P5, all of the data partitions are replaced with reference indicators A, B, C, and E, respectively. The ordering service 630 may then broadcast the transformed block 615 (containing only indicators A, B, C, and E) to all of the peers at operation 665. No updates to the dedup map are necessary in this scenario. The peers, in turn, may accept the new transformed block 615 and then reconstruct the actual/original block 605 using the method described with reference to FIGS. 5A and 5B. At flow marker 670, the peers may repeat operations 655-665 on the next block in the blockchain.

Blockchain Architecture

Figure 7A:
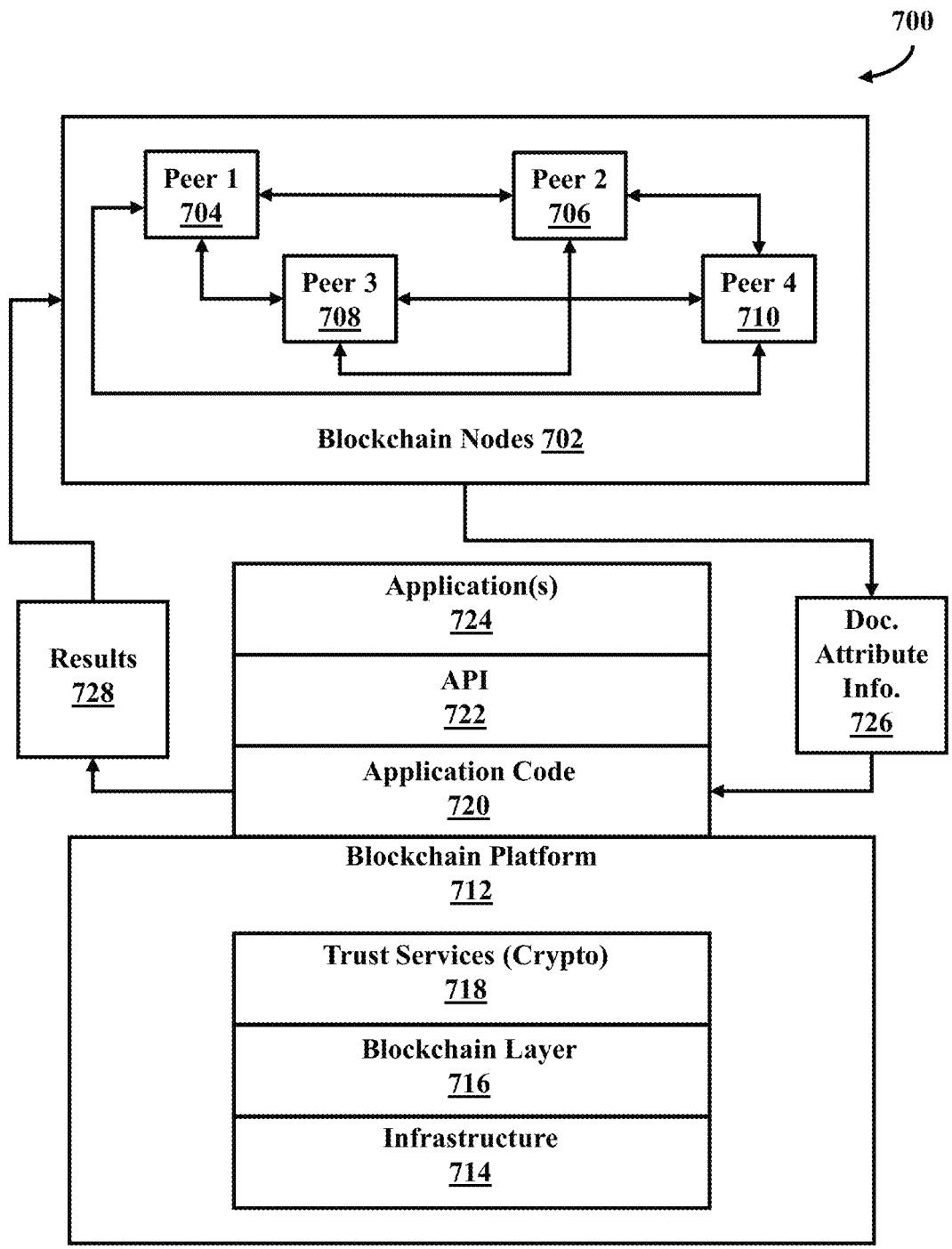
FIG. 7A depicts an example blockchain architecture configuration, consistent with some embodiments.

FIG. 7A illustrates a blockchain architecture configuration 700, consistent with some embodiments. The blockchain architecture 700 in these embodiments may include certain blockchain elements, for example, a group of blockchain nodes 702. The group of blockchain nodes 702, in turn, may include one or more member nodes 704-710 (these four nodes are depicted by example only). These member nodes 704-710 may participate in a number of activities, such as blockchain transaction addition and validation process (consensus). One or more of the member nodes 704-710 may endorse transactions based on endorsement policy and may provide an ordering service for all blockchain nodes in the architecture 700. A member node 704-710 may initiate a blockchain authentication and seek to write to a blockchain immutable ledger stored in blockchain layer 716, a copy of which may also be stored on the underpinning physical infrastructure 714.

The blockchain architecture 700 in some embodiments may include one or more applications 724, which are linked to application programming interfaces (APIs) 722 to access and execute stored program/application code 720 (e.g., chaincode, smart contracts, etc.). The stored program/application code 720, in turn, can be created according to a customized configuration sought by participants and can maintain its own state, control their own assets, and receive external information. The stored program/application code 720 can be deployed as a transaction and installed, via appending to the distributed ledger, on all blockchain nodes 704-710.

A blockchain base or platform 712 may include various layers of blockchain data, services (e.g., cryptographic trust services, virtual execution environment, etc.), and underpinning physical computer infrastructure that may be used to receive and store new transactions and provide access to auditors which are seeking to access data entries. A blockchain layer 716 may expose an interface that provides access to the virtual execution environment necessary to process the program code and engage a physical infrastructure 714. Cryptographic trust services 718 may be used to verify transactions such as asset exchange transactions and keep information private.

The blockchain architecture configuration of FIG. 7A may process and execute the program/application code 720 via one or more interfaces exposed, and services provided, by the blockchain platform 712. The program/application code 720 may control blockchain assets. For example, the code 720 can store and transfer data, and may be executed by member nodes 704-710 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, document attribute(s) information 726 may be processed by one or more processing entities (e.g., virtual machines) included in the blockchain layer 716. A result 728 may include a plurality of linked shared documents. The physical infrastructure 714 may be utilized to retrieve any of the data or information described herein.

In some embodiments, the smart contract may be created via a high-level application and programming language, and then written to a block in the blockchain. The smart contract may include executable code that is registered, stored, and/or replicated with a blockchain (e.g., distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols in some embodiments.

The smart contract may write data to the blockchain in the format of key-value pairs. In some embodiments, the smart contract code can also read the values stored in a blockchain and use them in application operations. The smart contract code in these embodiments can then write the output of various logic operations into the blockchain. The smart contract code, in some embodiments, may be used to create a temporary data structure in a virtual machine or other computing platforms. Data written to the blockchain in these embodiments may be public or may be encrypted and maintained as private. The temporary data that is used/generated by the smart contract may be held in memory by the supplied execution environment, and then may be deleted once the data needed for the blockchain is identified.

The chaincode in some embodiments may comprise a code interpretation of a smart contract, with additional features. In some embodiments, the chaincode may be implemented as program code deployed on a computing network, where it is executed and validated by chain validators together during a consensus process. The chaincode may receive a hash and may retrieve from the blockchain a hash associated with the data template created by the use of a previously stored feature extractor. If the hashes of the hash identifier and the hash created from the stored identifier template data match, then the chaincode may send an authorization key to the requested service. The chaincode may write to the blockchain data associated with the cryptographic details.

Figure 7B:
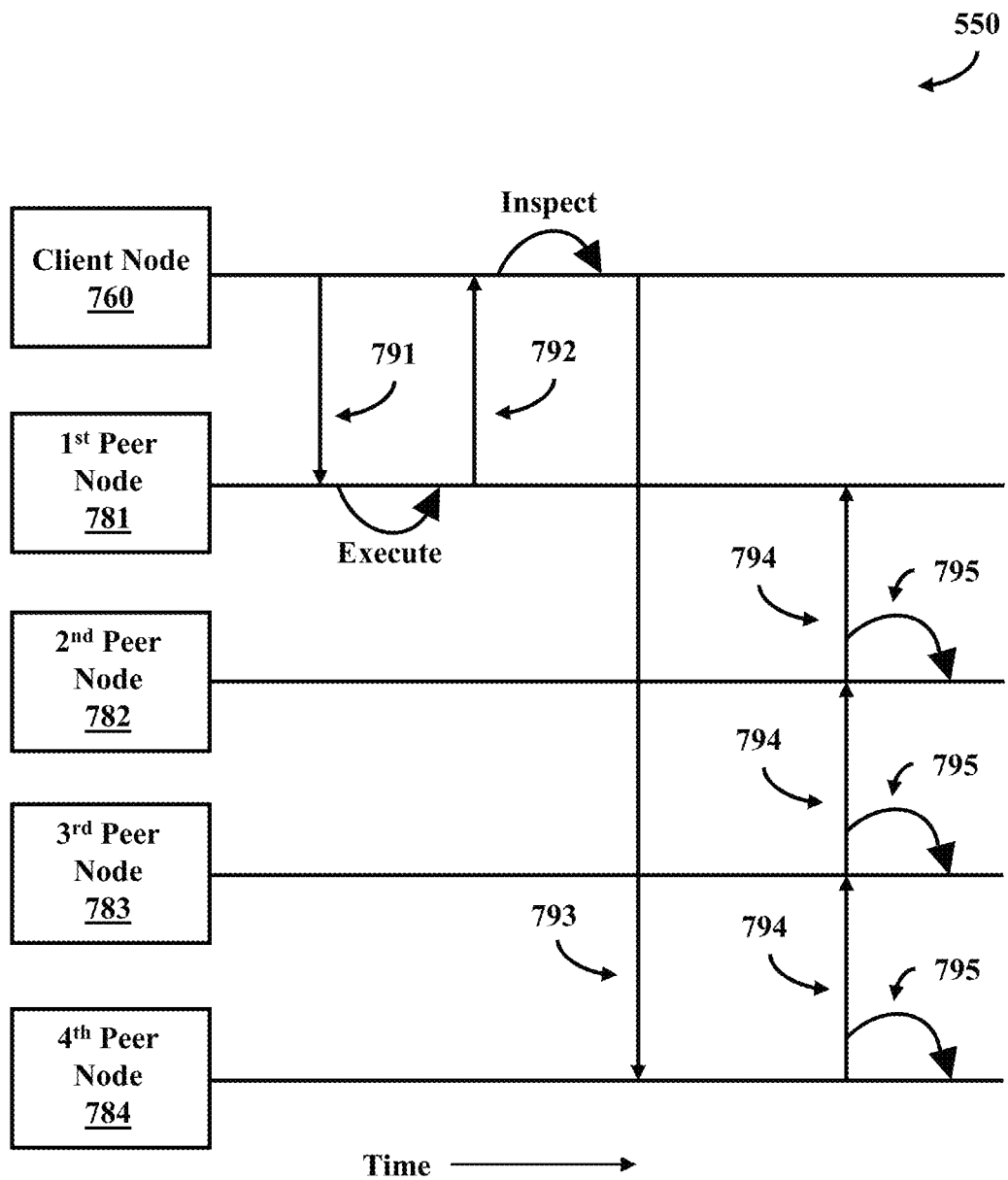
FIG. 7B illustrates a blockchain transactional flow, consistent with some embodiments.

FIG. 7B illustrates an example of a blockchain transactional flow 750 between nodes of the blockchain in accordance with some embodiments. The transaction flow in these embodiments may include a transaction proposal 791 sent by an application client node 760 to an endorsing peer node 781. The endorsing peer 781 may verify the client signature and execute a chaincode function to initiate the transaction. The output may include the chaincode results, a set of key/value versions that were read in the chaincode (read set), and the set of keys/values that were written in chaincode (write set). The proposal response 792 may then be sent back to the client 760, along with an endorsement signature, if approved.

In response, the client 760 may assemble the endorsements into a transaction payload 793 and broadcasts it to an ordering service node 784. The ordering service node 784 may then deliver ordered transactions as blocks to all peers 781-783 on a channel. Before committal to the blockchain, each peer 781-783 may validate the transaction. For example, the peers in some embodiments may check the endorsement policy to ensure that the correct allotment of the specified peers have signed the results and authenticated the signatures against the transaction payload 793.

With continuing reference to FIG. 7B, the client node 760 in some embodiments may initiate the transaction 791 by constructing and sending a request to the peer node 781, which may act an endorser. The client 760 may include an application leveraging a supported software development kit (SDK), which may utilize an available API to generate a transaction proposal. The transaction proposal, in turn, may be a request to invoke a chaincode function so that data can be read and/or written to the distributed ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 781 may verify: (a) that the transaction proposal is well-formed; (b) the transaction has not been submitted already in the past (replay-attack protection); (c) the signature is valid; and (d) that the submitter (client 760, in this example embodiment) is properly authorized to perform the proposed operation on that channel. The endorsing peer node 781 may take the transaction proposal inputs as arguments to the invoked chaincode function. The chaincode may then be executed against a current state database to produce transaction results, including a response value, read set, and write set. In some embodiments, no updates are made to the ledger at this point. Instead, the set of values, along with the endorsing peer node's 781 signature, may be passed back as a proposal response 792 to the SDK of the client 760, which parses the payload for the application to consume.

In response, the application of the client 760 may inspect/verify the endorsing peers' signatures and may compare the proposal responses to determine if the proposal response is the same. If the chaincode only queried the ledger, the application may inspect the query response and would typically not submit the transaction to the ordering service 784. If the client application intends to submit the transaction to the ordering service 784 to update the ledger, the application may determine if the specified endorsement policy has been fulfilled before submitting (i.e., did all peer nodes necessary for the transaction endorse the transaction). Here, the client may include only one of a multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After a successful inspection, in operation 793, the client 760 may assemble endorsements into a transaction and may broadcast the transaction proposal and response within a transaction message to the ordering service 784. The transaction may contain the read/write sets, the endorsing peers' signatures, and a channel ID. The ordering service 784 does not need to inspect the entire content of a transaction in order to perform its operation; instead the ordering service 784 may simply receive transactions from all channels in the network, order them chronologically by channel, and create blocks of transactions per channel.

The blocks of the transaction may be delivered from the ordering service 784 to all peer nodes 781-783 on the channel. The transactions 794 within the block may be validated to ensure any endorsement policy is fulfilled and to ensure that there have been no changes to ledger state for read set variables since the read set was generated by the transaction execution. Transactions in the block may be tagged as being valid or invalid. Furthermore, in operation 795, each peer node 781-783 may append the block to the channel's chain, and for each valid transaction, the write sets are committed to the current state database. An event may be emitted to notify the client application that the transaction (invocation) has been immutably appended to the chain, as well as to notify whether the transaction was validated or invalidated.

Permissioned Blockchains

Figure 8A:
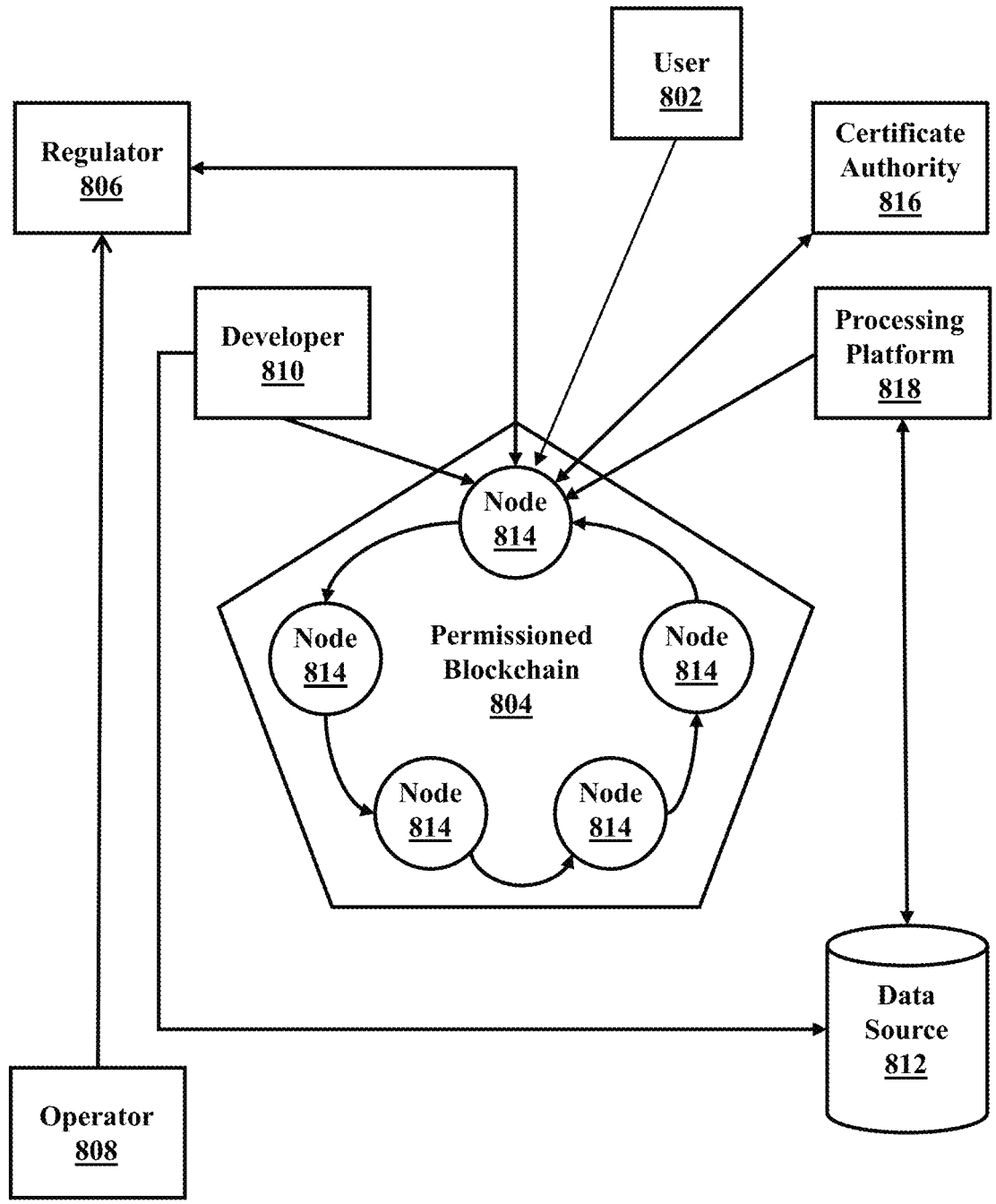
FIG. 8A illustrates a flow diagram, consistent with some embodiments.

FIG. 8A illustrates an example of a permissioned blockchain network, which features a distributed, decentralized peer-to-peer architecture, consistent with some embodiments. In this example, a blockchain user 802 may initiate a transaction to the permissioned blockchain 804. In this example, the transaction may be a deploy, invoke, or query, and may be issued through a client-side application leveraging an SDK, directly through an API, etc. Networks may provide access to a regulator 806, such as an auditor. A blockchain network operator 808 manages member permissions, such as enrolling the regulator 806 as an "auditor" and the blockchain user 802 as a "client." An auditor may be restricted only to querying the ledger, whereas a client may be authorized to deploy, invoke, and query certain types of chaincode.

A blockchain developer 810 can write chaincode and client-side applications in some embodiments. The blockchain developer 810 in these embodiments may deploy chaincode directly to the network through an interface. To include credentials from a traditional data source 812 in chaincode, the developer 810 may use an out-of-band connection to access the data. In this example, the blockchain user 802 may connect to the permissioned blockchain 804 through a peer node 814. Before proceeding with any transactions, the peer node 814 may retrieve the user's enrollment and transaction certificates from a certificate authority 816, which manages user roles and permissions. In some embodiments, blockchain users must possess these digital certificates in order to transact on the permissioned blockchain 804. In other embodiments, blockchain users may be authenticated using other techniques, such as via distributed chains of trust. Meanwhile, a user attempting to utilize chaincode may be required to verify their credentials on the traditional data source 812. Chaincode may use an out-of-band connection to this data through a traditional processing platform 818 to confirm the user's authorization.

Figure 8B:
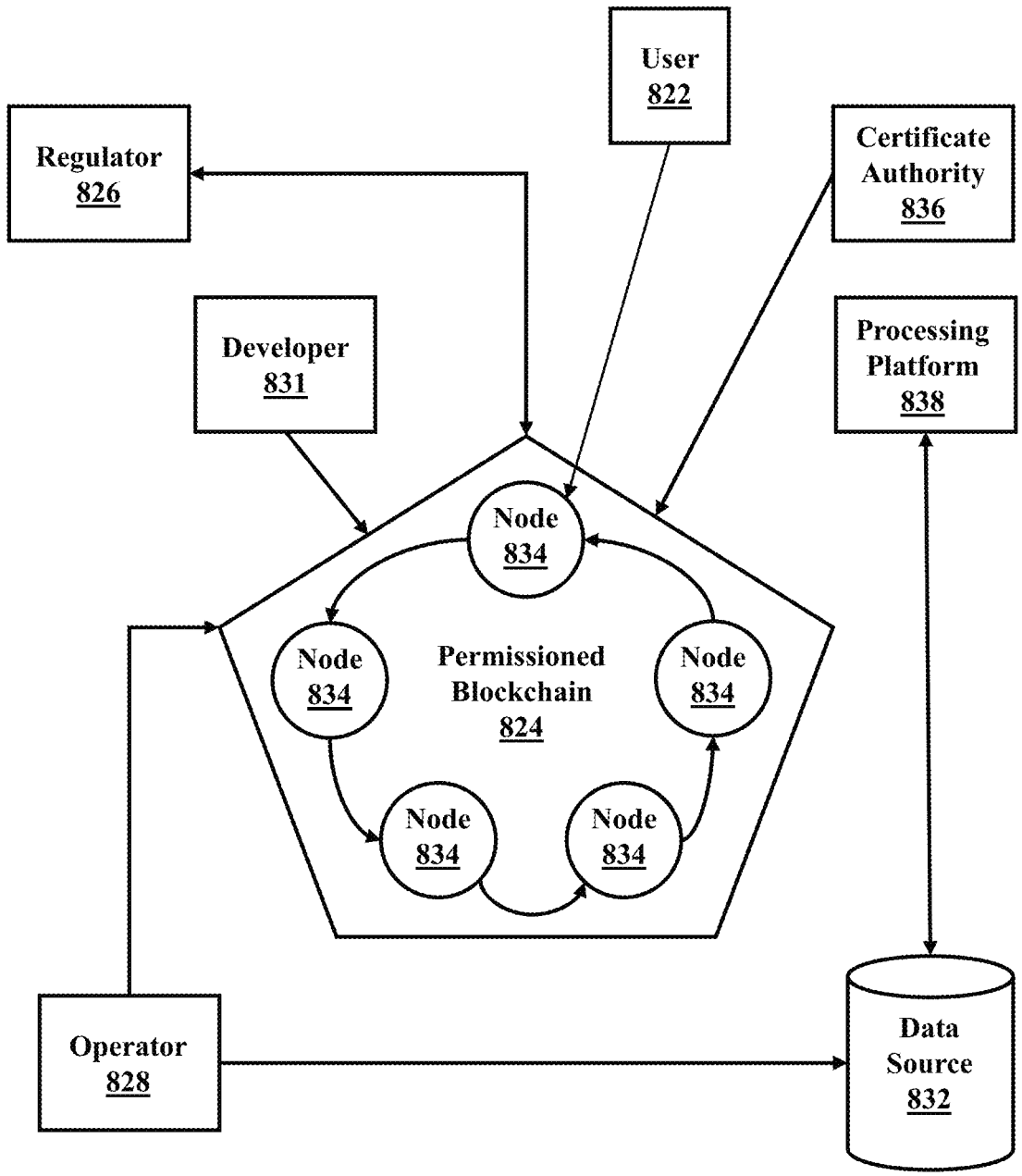
FIG. 8B illustrates a further flow diagram, consistent with some embodiments.

FIG. 8B illustrates another example of a permissioned blockchain network, which features a distributed, decentralized peer-to-peer architecture, consistent with some embodiments. In this example, a blockchain user 822 may submit a transaction to the permissioned blockchain 824. In this example, the transaction can be a deploy, invoke, or query, and may be issued through a client-side application leveraging an SDK, directly through an API, etc. Networks may provide access to a regulator 826, such as an auditor. A blockchain network operator 828 manages member permissions, such as enrolling the regulator 826 as an "auditor" and the blockchain user 822 as a "client." An auditor could be restricted only to querying the ledger, whereas a client could be authorized to deploy, invoke, and query certain types of chaincode.

A blockchain developer 831 in these embodiments may write chaincode and client-side applications. The blockchain developer 831 may deploy chaincode directly to the network through an interface. To include credentials from a traditional data source 832 in chaincode, the developer 831 may use an out-of-band connection to access the data. In this example, the blockchain user 822 connects to the network through a peer node 834. Before proceeding with any transactions, the peer node 834 retrieves the user's enrollment and transaction certificates from the certificate authority 836. In some embodiments, blockchain users must possess these digital certificates in order to transact on the permissioned blockchain 824. In other embodiments, blockchain users may be authenticated using other techniques, such as via distributed chains of trust. Meanwhile, a user attempting to utilize chaincode may be required to verify their credentials on the traditional data source 832. Chaincode can use an out-of-band connection to this data through a traditional processing platform 838 to confirm the user's authorization.

Figure 8C:
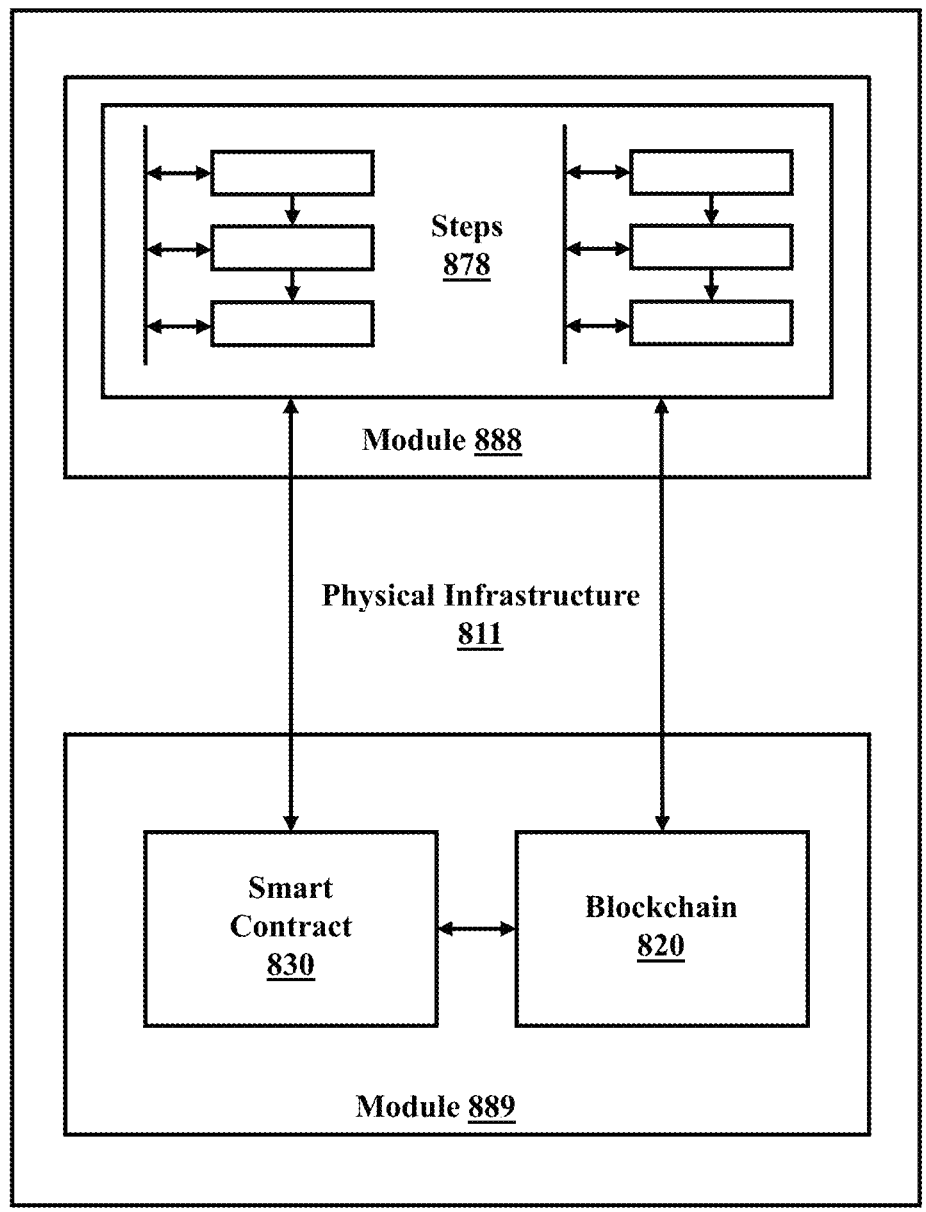
FIG. 8C illustrates an example system configured to perform one or more operations described herein, consistent with some embodiments.

FIG. 8C illustrates an example system that includes a physical infrastructure 811 configured to perform various operations, consistent with some embodiments. Referring to FIG. 6C, the physical infrastructure 811 includes a module 888 and a module 889. The module 819 includes a blockchain 820 and a smart contract 830 (which may reside on the blockchain 820) that may execute any of the operational steps 878 (in module 812) included in any of the example embodiments. The steps/operations 878 may include one or more of the embodiments described or depicted and may represent output or written information that is written or read from one or more smart contracts 830 and/or blockchains 820. The physical infrastructure 811, the module 888, and the module 889 may include one or more computers, servers, processors, memories, and/or wireless communication devices. Further, the module 888 and the module 889 may be the same module.

Figure 8D:
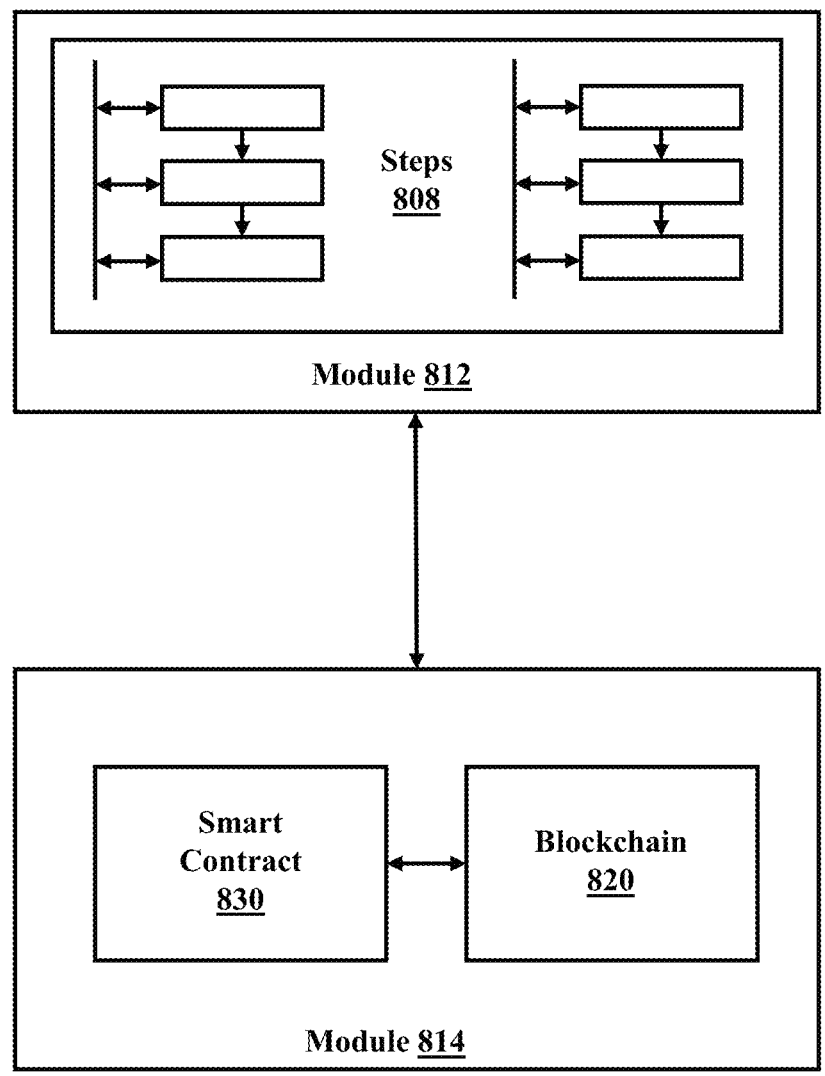
FIG. 8D illustrates another example system configured to perform one or more operations described herein, consistent with some embodiments.

FIG. 8D illustrates another example system configured to perform various operations, consistent with some embodiments. Referring to FIG. 8D, the system includes a module 812 and a module 814. The module 814 includes a blockchain 820 and a smart contract 830 (which may reside on the blockchain 820) that may execute any of the operational steps 878 (in module 812) included in any of the example embodiments. The steps/operations 878 may include one or more of the embodiments described or depicted and may represent output or written information that is written or read from one or more smart contracts 830 and/or blockchains 820. The physical module 812 and the module 814 may include one or more computers, servers, processors, memories, and/or wireless communication devices. Further, the module 812 and the module 814 may be the same module.

Figure 8E:
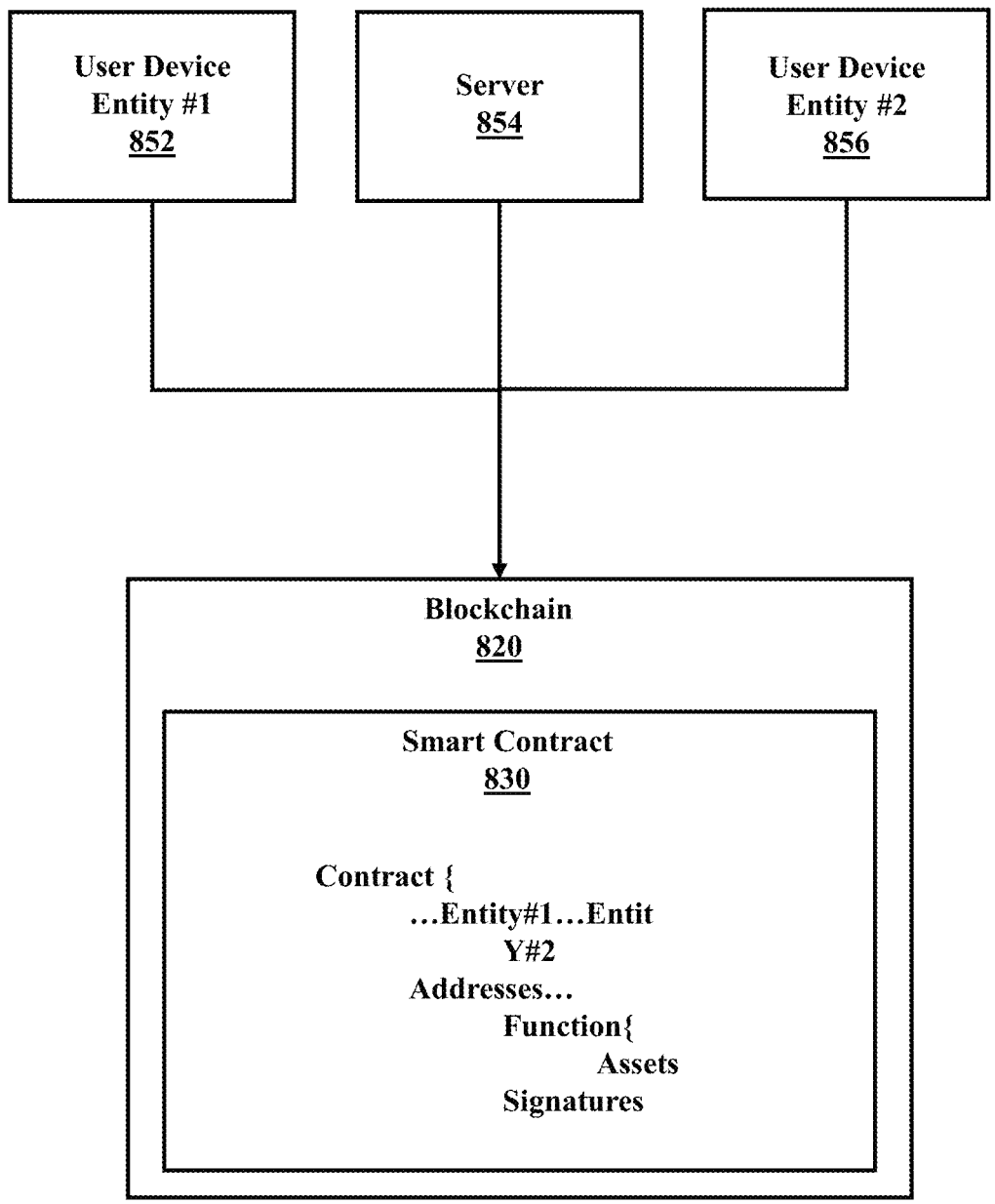
FIG. 8E illustrates a further example system configured to utilize a smart contract, consistent with some embodiments.

FIG. 8E illustrates an example system configured to utilize a smart contract configuration among contracting parties and a mediating server configured to enforce the smart contract terms on the blockchain 820, consistent with some embodiments. Referring to FIG. 8E, the configuration may represent a communication session, an asset transfer session, or a process or procedure that is driven by a smart contract 830, which explicitly identifies one or more user devices 852 and/or 856. The execution, operations, and results of the smart contract execution may be managed by a server 854. Content of the smart contract 830 may require digital signatures by one or more of the entities 852 and 856, which are parties to the smart contract transaction. The results of the smart contract execution may be written to a blockchain 820 as a blockchain transaction. The smart contract 830 resides on the blockchain 820, which may reside on one or more computers, servers, processors, memories, and/or wireless communication devices.

Figure 8F:
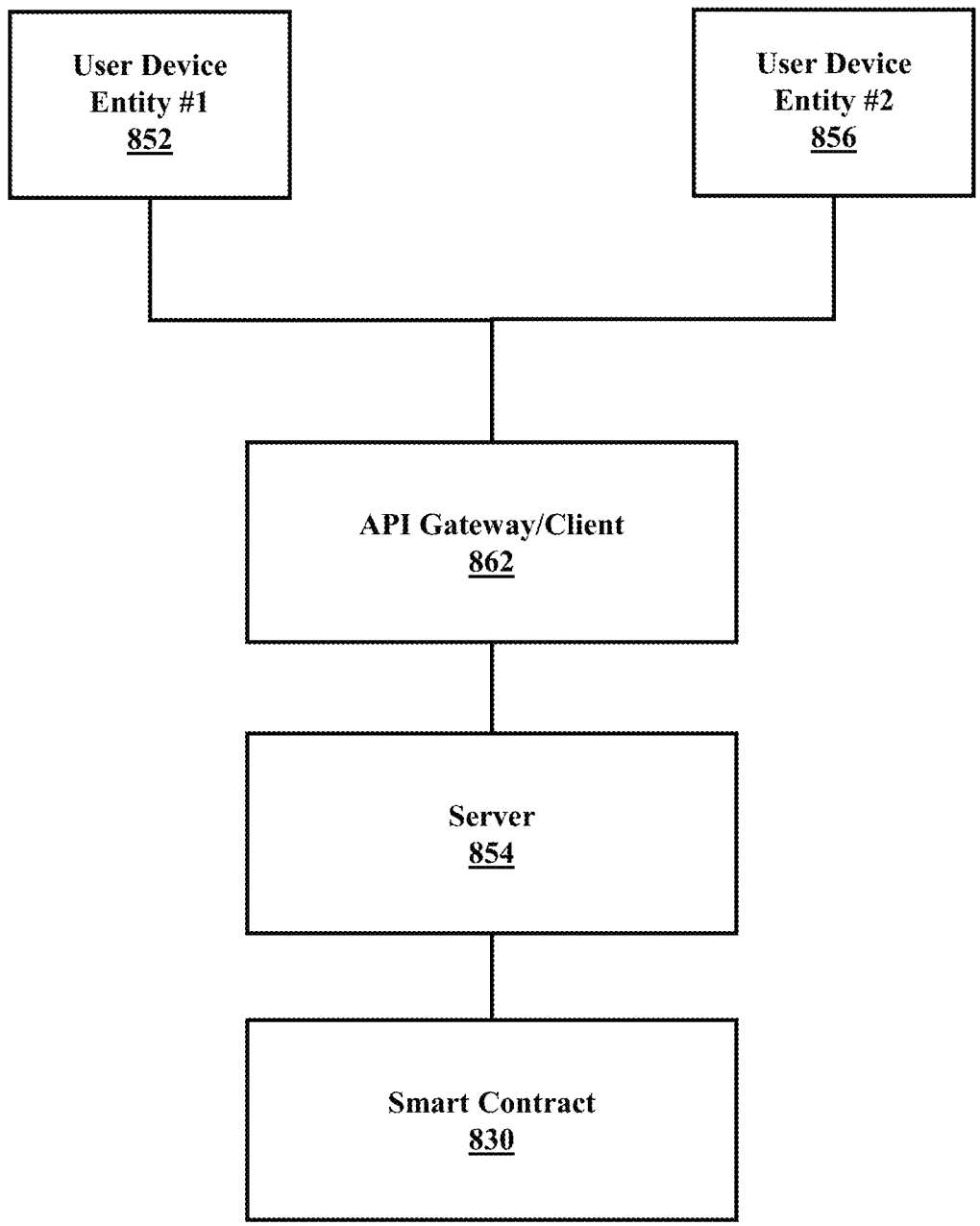
FIG. 8F illustrates a system including a blockchain, consistent with some embodiments.

FIG. 8F illustrates a system 860, including a blockchain, consistent with some embodiments. Referring to the example of FIG. 8D, an application programming interface (API) gateway 862 provides a common interface for accessing blockchain logic (e.g., smart contract 830 or other chaincode) and data (e.g., distributed ledger, etc.). In this example, the API gateway 862 is a common interface for performing transactions (invoke, queries, etc.) on the blockchain by connecting one or more entities 852 and 856 to a blockchain peer (i.e., server 854). Here, the server 854 is a blockchain network peer component that holds a copy of the world state and a distributed ledger allowing clients 852 and 856 to query data on the world stage as well as submit transactions into the blockchain network where depending on the smart contract 830 and endorsement policy, endorsing peers will run the smart contracts 830.

Block Processing

Figure 9A:
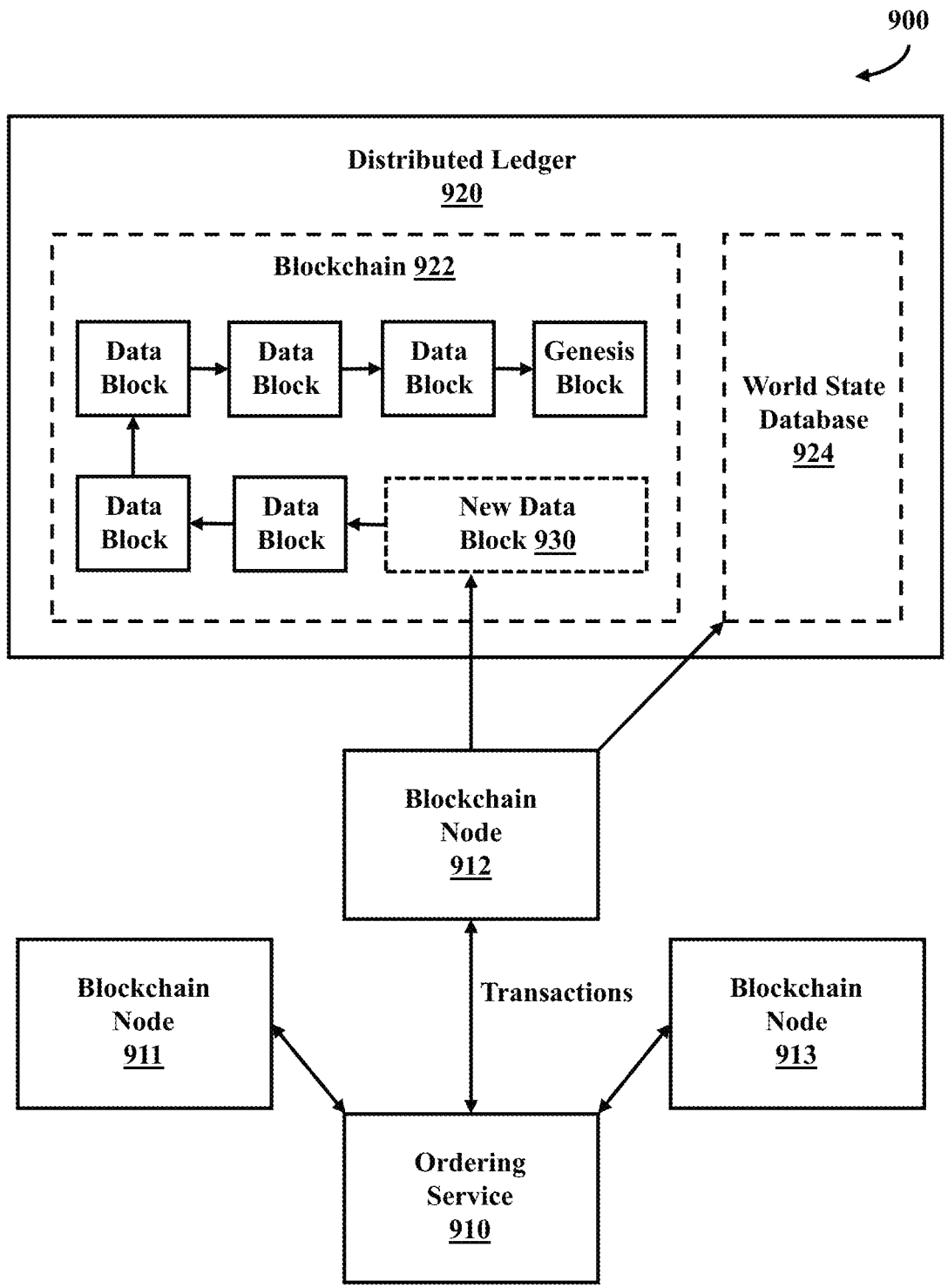
FIG. 9A illustrates a process for a new block being added to a distributed ledger, according to example embodiments.

FIG. 9A illustrates a process 900 of a new data block 930 being added to a distributed ledger 920, consistent with some embodiments, and FIG. 7B illustrates contents of a new data block 930 for blockchain, consistent with some embodiments. The new data block 930 may contain document linking data.

Referring to FIG. 9A, clients (not shown) may submit transactions to blockchain nodes 911, 912, and/or 913. Clients may be instructions received from any source to enact activity on the blockchain 922. As an example, clients may be applications that act on behalf of a requester, such as a device, person, or entity to propose transactions for the blockchain. The plurality of blockchain peers (e.g., blockchain nodes 911, 912, and 913) may maintain a state of the blockchain network and a copy of the distributed ledger 920. Different types of blockchain nodes/peers may be present in the blockchain network including endorsing peers which simulate and endorse transactions proposed by clients and committing peers which verify endorsements, validate transactions, and commit transactions to the distributed ledger 920. In some embodiments, the blockchain nodes 911, 912, and 913 may perform the role of endorser node, committer node, or both.

Figure 9B:
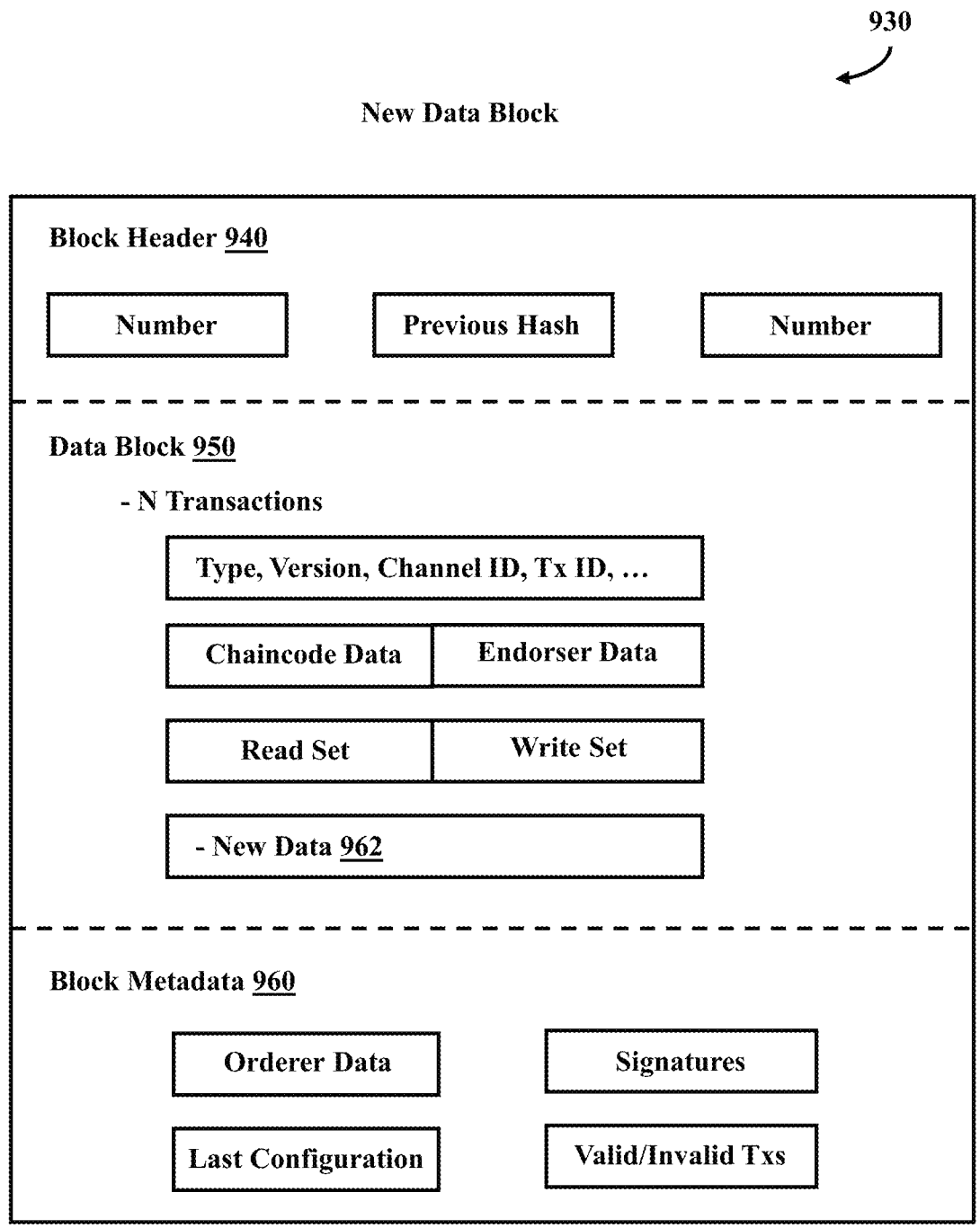
FIG. 9B illustrates contents of a new data block, according to example embodiments.

The distributed ledger 920 may include a blockchain which stores immutable, sequenced records in blocks, and a state database 924 (current world state) maintaining a current state of the blockchain 922. One distributed ledger 920 may exist per channel and each peer maintains its own copy of the distributed ledger 920 for each channel of which they are a member. The blockchain 922 may be a transaction log, structured as hash-linked blocks where each block contains a sequence of N transactions. Blocks may include various components such as shown in FIG. 9B. The linking of the blocks (shown by arrows in FIG. 9A) may be generated by adding a hash of a prior block's header within a block header of a current block. In this way, all transactions on the blockchain 922 may be sequenced and cryptographically linked together preventing tampering with blockchain data without breaking the hash links. Furthermore, because of the links, the latest block in the blockchain 922 represents every transaction that has come before it. The blockchain 922 may be stored on a peer file system (local or attached storage), which supports an append-only blockchain workload.

The current state of the blockchain 922 and the distributed ledger 920 may be stored in the state database 924. Here, the current state data represents the latest values for all keys ever included in the chain transaction log of the blockchain 922. Chaincode invocations execute transactions against the current state in the state database 924. To make these chaincode interactions more efficient, the latest values of all keys may be stored in the state database 924. The state database 924 may include an indexed view into the transaction log of the blockchain 922, it can therefore be regenerated from the chain at any time. The state database 924 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement, which is a signed response from the endorsing node to the client application indicating the endorsement of the simulated transaction. The method of endorsing a transaction depends on an endorsement policy that may be specified within chaincode. An example of an endorsement policy is "the majority of endorsing peers must endorse the transaction." Different channels may have different endorsement policies. Endorsed transactions are forward by the client application to ordering service 910.

The ordering service 910 accepts endorsed transactions, orders them into a block, and delivers the blocks to the committing peers. For example, the ordering service 910 may initiate a new block when a threshold of transactions has been reached, a timer times out, or another condition. In the example of FIG. 9A, blockchain node 912 is a committing peer that has received a new data new data block 930 for storage on blockchain 922. The first block in the blockchain may be referred to as a genesis block, which includes information about the blockchain, its members, the data stored therein, etc.

The ordering service 910 may be made up of a cluster of ordering nodes. The ordering service 910 in some embodiments may not process transactions, smart contracts, or maintain the shared ledger. Rather, the ordering service 910 in these embodiments may accept the endorsed transactions and specify the order in which those transactions are committed to the distributed ledger 920. The architecture of the blockchain network may be designed such that the specific implementation of "ordering" (e.g., Solo, Kafka, BFT, etc.) becomes a pluggable component.

Transactions in some embodiments may be written to the distributed ledger 920 in a consistent order. The order of transactions in these embodiments may be established to ensure that the updates to the state database 924 are valid when they are committed to the network. Unlike a cryptocurrency blockchain system (e.g., Bitcoin, etc.), where ordering occurs through the solving of a cryptographic puzzle, or mining, in this example the parties of the distributed ledger 920 may choose the ordering mechanism that best suits that network.

In some embodiments, when the ordering service 910 initializes a new data block 930, the new data block 930 may be broadcast to committing peers (e.g., blockchain nodes 911, 912, and 913). In response, each committing peer may validate the transaction within the new data block 930 by checking to make sure that the read set and the write set still match the current world state in the state database 924. Specifically, the committing peer may determine whether the read data that existed when the endorsers simulated the transaction is identical to the current world state in the state database 924. When the committing peer validates the transaction, the transaction may be written to the blockchain 922 on the distributed ledger 920, and the state database 924 may be updated with the write data from the read-write set. In some embodiments, if a transaction fails (e.g., if the committing peer finds that the read-write set does not match the current world state in the state database 924), the transaction ordered into a block may still be included in that block, but marked as invalid, and the state database 924 not updated.

Referring to FIG. 9B, a new data block 930 (also referred to as a data block) that is stored on the blockchain 922 of the distributed ledger 920 may include multiple data segments in some embodiments, such as a block header 940, block data 950, and block metadata 960. It should be appreciated that the various depicted blocks and their contents, such as new data block 930 and its contents, shown in FIG. 9B are merely examples and are not meant to limit the scope of the example embodiments. The new data block 930 may store transactional information of N transaction(s) (e.g., 1, 10, 100, 200, 1000, 2000, 3000, etc.) within the block data 950. The new data block 930 may also include a link to a previous block (e.g., on the blockchain 922 in FIG. 9A) within the block header 940. In particular, the block header 940 may include a hash of a previous block's header. The block header 940 may also include a unique block number, a hash of the block data 950 of the new data block 930, and the like. The block number of the new data block 930 may be unique and assigned in various orders, such as an incremental/sequential order starting from zero.

The block data 950 may store transactional information of each transaction that is recorded within the new data block 930. For example, the transaction data may include one or more of: a type of the transaction, a version, a timestamp, a channel ID of the distributed ledger 920, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 950 may also store new data 962, which adds additional information to the hash-linked chain of blocks in the blockchain 922. The additional information may include one or more of the steps, features, processes and/or actions described or depicted herein. Accordingly, the new data 962 may be stored in an immutable log of blocks on the distributed ledger 920. Some of the benefits of storing such new data 962 are reflected in the various embodiments disclosed and depicted herein. Although in FIG. 9B the new data 962 is depicted in the block data 950, it could also be located in the block header 940 or the block metadata 960 in some embodiments. The new data 962 may also include a document composite key that is used for linking the documents within an organization.

The block metadata 960 may store multiple fields of metadata (e.g., as a byte array, etc.). Metadata fields may include: signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 910. Meanwhile, a committer of the block (such as blockchain node 912) may add validity/invalidity information based on an endorsement policy, verification of read/write sets, and the like. The transaction filter may include a byte array of a size equal to the number of transactions in the block data 950 and a validation code identifying whether a transaction was valid/invalid.

Figure 9C:
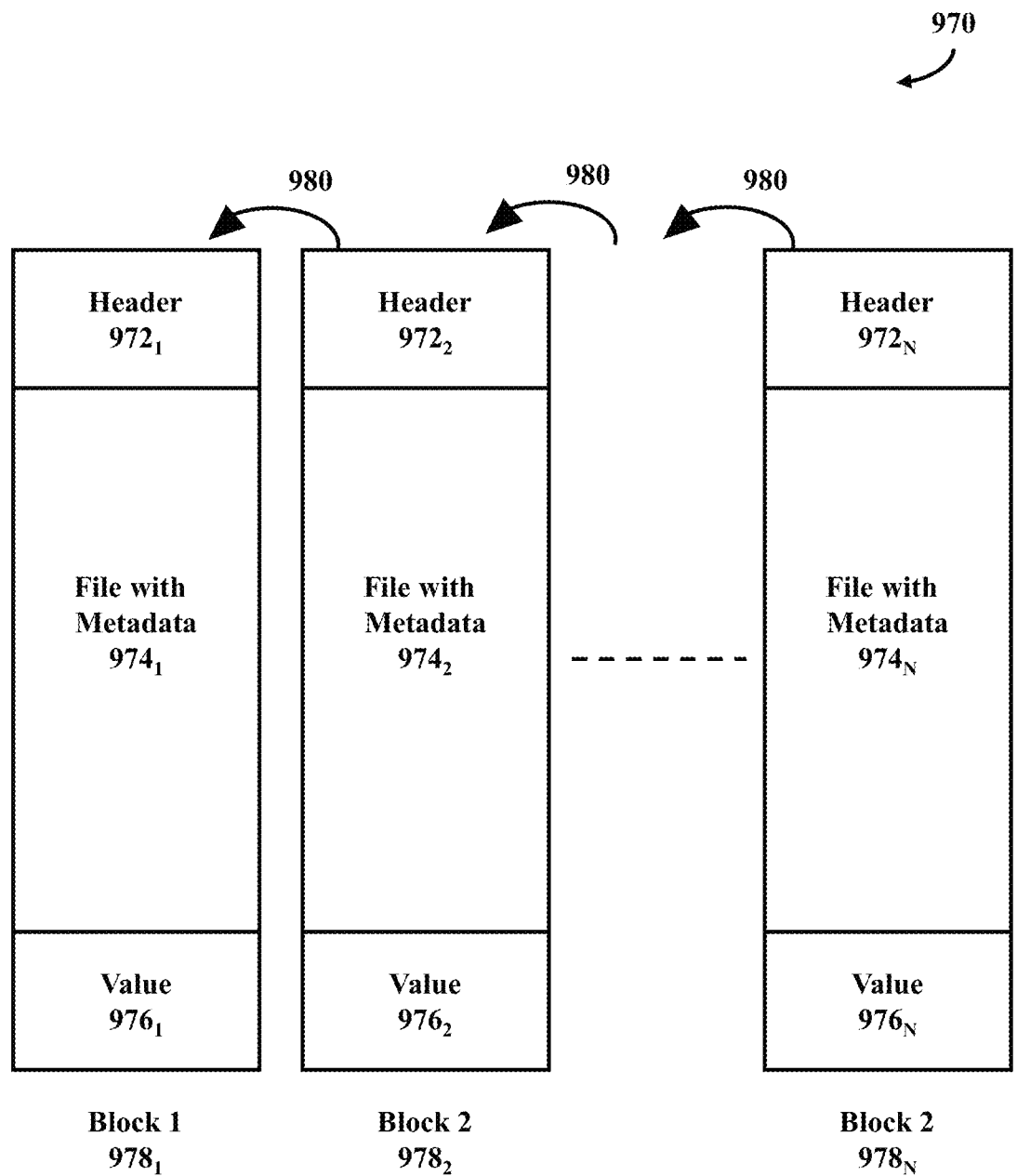
FIG. 9C illustrates a blockchain for digital content, according to example embodiments.

FIG. 9C illustrates an embodiment of a blockchain 970 for digital content, consistent with some embodiments. The digital content may include one or more files and associated information. The files may include transaction data, media, images, video, audio, text, links, graphics, animations, web pages, documents, or other forms of digital content. The immutable, append-only aspects of some blockchain embodiments may be desirable to serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain in these embodiments may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may not be included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| . | . |
| Block N Hash Value | Block N Hash Value ... Content |

In the example embodiment of FIG. 7C, the blockchain 970 includes a number of blocks $978_1$, $978_2$, ... $978_N$ cryptographically linked in an ordered sequence, where N≥1. The encryption used to link the blocks $978_1$, $978_2$, ... $978_N$ may be any of a number of keyed or un-keyed Hash functions. In one embodiment, the blocks $978_1$, $978_2$, ... $978_N$ are subject to a hash function that produces n-bit alphanumeric outputs (where n is 256 or another number) from inputs that are based on information in the blocks. Examples of such a hash function include, but are not limited to: an SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $978_1$, $978_2$, ..., $978_N$ may be cryptographically linked by a function that is different from a hash function. For purposes of illustration, the following description is made with reference to a hash function, e.g., SHA-2.

Each of the blocks $978_1$, $978_2$, ..., $978_N$ in the blockchain may include a header, a version of the file, and a value. The header and the value may be different for each block as a result of hashing in the blockchain. In one embodiment, the value may be included in the header. As described in greater detail below, the version of the file may be the original file or may be a different version of the original file.

The first block $978_1$ in the blockchain is referred to as the genesis block and may include the header $972_1$, original file $974_1$, and an initial value $976_1$. The hashing scheme used for the genesis block, and indeed in all subsequent blocks, may vary. For example, all the information in the first block $978_1$ may be hashed together and at one time, or each or a portion of the information in the first block $978_1$ may be separately hashed, and then a hash of the separately hashed portions may be performed.

The header $972_1$ may include one or more initial parameters, which, for example, may include a version number, timestamp, nonce, root information, difficulty level, consensus protocol, duration, media format, source, descriptive keywords, and/or other information associated with original file $974_1$ and/or the blockchain. The header $972_1$ may be generated automatically (e.g., by blockchain network managing software) or manually by a blockchain participant. Unlike the header in other blocks $978_2$ to $978_N$ in the blockchain, the header $972_1$ in the genesis block may not reference a previous block, simply because there is no previous block.

The original file $974_1$ in the genesis block may be, for example, data as captured by a device with or without processing prior to its inclusion in the blockchain. The original file $974_1$ may be received through the interface of the system from the device, media source, or node. The original file $974_1$ may be associated with metadata, which, for example, may be generated by a user, the device, and/or the system processor, either manually or automatically. The metadata may be included in the first block $978_1$ in association with the original file $974_1$.

The value $976_1$ in the genesis block may be an initial value generated based on one or more unique attributes of the original file $974_1$. In one embodiment, the one or more unique attributes may include the hash value for the original file $974_1$, metadata for the original file $974_1$, and other information associated with the file. In one implementation, the initial value $976_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $978_2$ to $978_N$ in the blockchain also have headers, files, and values. However, unlike the header $972_1$ of the first block, each of the headers $972_2$ to $972_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 980, to establish an auditable and immutable chain-of-custody.

Each of the header $972_2$ to $972_N$ in the other blocks may also include other information, e.g., version number, timestamp, nonce, root information, difficulty level, consensus protocol, and/or other parameters or information associated with the corresponding files and/or the blockchain in general.

The files $974_2$ to $974_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing, which involves analyzing a file, may include, for example, appending, including, or otherwise associating various analytics, statistics, or other information associated with the file.

The values in each of the other blocks $976_2$ to $976_N$ in the other blocks are unique values and are all different as a result of the processing performed. For example, the value in any one block corresponds to an updated version of the value in the previous block. The update is reflected in the hash of the block to which the value is assigned. The values of the blocks, therefore, provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block, including the redacted file, will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In one embodiment, the value of a previous block may be updated (e.g., a new hash value computed) to form the value of a current block when any one or more of the following occurs. The new hash value may be computed by hashing all or a portion of the information noted below, in this example embodiment.
 a) new SHA-2 computed hash value if the file has been processed in any way (e.g., if the file was redacted, copied, altered, accessed, or some other action was taken)
 b) new storage location for the file
 c) new metadata identified associated with the file
 d) transfer of access or control of the file from one blockchain participant to another blockchain participant FIG. 9D illustrates an embodiment of a block, which may represent the structure of the blocks in the blockchain 990, consistent with some embodiments. The block, $Block_i$, may include a header $972_i$, a file $974_i$, and a value $976_i$.

The header 972*i* may include a hash value of a previous block $Block_{i-1}$ and additional reference information, which, for example, may be any of the types of information (e.g., header information including references, characteristics, parameters, etc.) discussed herein. All blocks in some embodiments may reference the hash of a previous block except the genesis block in some embodiments. The hash value of the previous block may be just a hash of the header in the previous block or a hash of all or a portion of the information in the previous block, including the file and metadata.

The file $974_i$ may include a plurality of data, such as Data 1, Data 2, . . . , Data N in sequence. The data are tagged with Metadata 1, Metadata 2, . . . , Metadata N, which describe the content and/or characteristics associated with the data. For example, the metadata for each data may include: information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF1, REF2, . . . , $REF_N$ to a previous data to prevent tampering, gaps in the file, and sequential reference through the file.

Once the metadata is assigned to the data (e.g., through a smart contract), the metadata cannot be altered without the hash changing in some embodiments, which can easily be identified for invalidation. The metadata in these embodiments, thus, creates a data log of information that may be accessed for use by participants in the blockchain.

The value $976_i$ in some embodiments may be a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 970 is formed, at any point in time, the immutable chain-of-custody for the file may be obtained by querying the blockchain for the transaction history of the values across the blocks in some embodiments. This query, or tracking procedure, may begin with decrypting the value of the block that is most currently included (e.g., the last (Nth) block), and then continuing to decrypt the value of the other blocks until the genesis block is reached and the original file is recovered. The decryption may involve decrypting the headers and files and associated metadata at each block, as well.

Decryption may be performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key may be associated with each other through some mathematical relationship. The public key may be distributed publicly to serve as an address to receive messages from other users, e.g., an IP address or home address. The private key may be kept secret and may be used to digitally sign messages sent to other blockchain participants. The signature, in turn, may be included in the message so that the recipient can verify using the public key of the sender. This way, the recipient can be confident that only the sender could have sent this message.

In some embodiments, generating a key pair may be analogous to creating an account on the blockchain, but without having to actually register anywhere. In these embodiments, every transaction that is executed on the blockchain may be digitally signed by the sender using their private key. This signature may help ensure that only the owner of the account can track and process (if within the scope of permission determined by a smart contract) the file of the blockchain.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided amongst different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the customer's computer, partly on the customer's computer, as a stand-alone software package, partly on the customer's computer and partly on a remote computer or entirely on the remote computer or server. In the latter scenario, the remote computer may be connected to the customer's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

General

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A method for deduplicating a distributed ledger in a blockchain network, comprising:
   splitting a new block for a distributed ledger into a plurality of partitions;
   comparing the plurality of partitions to data in a deduplication (dedup) map, and in response, adding new data from the plurality of partitions to the dedup map;
   replacing a first partition of the plurality of partitions with a first reference from the dedup map to produce a transformed block;
   communicating the transformed block via a network interface to one or more peers; and
   in response to a new user joining the blockchain network or a crashed peer rebooting, receiving a request for a copy of the distributed ledger from a requesting peer node, the distributed ledger comprising a plurality of previously accepted blocks, and in response:
   splitting one of the plurality of previously accepted blocks into a plurality of previously accepted block partitions;
   comparing the plurality of previously accepted block partitions to the dedup map;
   replacing at least some of the previously accepted block partitions with reference indexes from the dedup map to produce a transformed previously accepted block; and
   communicating the transformed previously accepted block over the blockchain network to the requesting peer node.

2. The method of claim 1, further comprising:
   creating a second reference in the dedup map;
   replacing a second partition of the plurality of partitions with the second reference; and
   communicating the second reference via the network interface to the one or more peers.

3. The method of claim 2, further comprising:
   receiving the second reference; and
   updating a local copy of the dedup map with the second reference.

4. The method of claim 2, further comprising:
   determining whether the second partition is currently referenced in the dedup map;
   responsive to the second partition being currently referenced, replacing the second partition with the second reference to produce the transformed block; and
   responsive to the second partition not being currently referenced, communicating the transformed block with the second partition.

5. The method of claim 1, further comprising:
   receiving the transformed block; and
   reconstructing the new block using the transformed block and a local copy of the dedup map.

6. The method of claim 1, further comprising:
   receiving a subsequent block for addition to the distributed ledger;
   splitting the subsequent block on the distributed ledger into a plurality of subsequent block partitions;
   comparing the plurality of subsequent block partitions to the dedup map;
   replacing a first partition of the plurality of subsequent partitions with the first reference from the dedup map to produce a transformed subsequent block; and
   communicating the transformed subsequent block over the network to a one or more peers in the distributed ledger.

7. The method of claim 6, wherein adding new data from the plurality of partitions to the dedup map comprises adding at least one of the plurality of subsequent block partitions to the dedup map to create an updated dedup map.

8. The method of claim 1, wherein the communication of the first partition is by the first reference responsive to the first partition already existing in the dedup map.

9. The method of claim 1, further comprising reconstructing the new block from the transformed block and the dedup map.

10. The method of claim 1, wherein:
    the request for a copy of the distributed ledger is received at a peer node; and
    the transformed previously accepted block is communicated to the requesting node using a gossip protocol.

11. The method of claim 1, further comprising building a copy of the dedup map at the requesting node.

12. The method of claim 1, further comprising transmitting a first block in the distributed ledger without transformation.

13. The method of claim 1, wherein the receiving a request for a copy of the distributed ledger is received from a new node joining the distributed ledger.

14. The method of claim 1, wherein the receiving a request for a copy of the distributed ledger is received from a node in the distributed ledger that rebooted after a crash.

15. The method of claim 1, wherein the dedup map is maintained at an ordering node; and further comprising transmitting updates to the dedup map to a plurality of peer nodes.

16. The method of claim 1, further comprising, in response to the dedup map exceeding a predetermined size, selectively deleting portions of the dedup map.

17. The method of claim 16, further comprising changing the predetermined size.

18. A system, comprising:
    an ordering service communicatively coupled to a blockchain network, the blockchain network comprising a plurality of peer nodes and a distributed ledger, wherein:
    the ordering service is configured to perform a deduplication (dedup) method comprising:
    splitting a new block on the blockchain into a plurality of partitions;
    comparing the plurality of partitions to data in a first dedup map, and in response, adding new data from the plurality of partitions to the first dedup map;
    replacing a first partition of the plurality of partitions with a reference index from the first dedup map to produce a transformed block; and communicating the transformed block to the plurality of peer nodes in the blockchain;

at least some of the peer nodes are configured to perform a boot-up acceleration method, comprising:

in response to a new user joining the blockchain network or a crashed peer rebooting, receive a request for a copy of the distributed ledger from a requesting peer node, the distributed ledger comprising a plurality of previously accepted blocks, and in response:

split one of the plurality of previously accepted blocks into a plurality of previously accepted block partitions;

compare the plurality of previously accepted block partitions to a second dedup map; replace at least some of the previously accepted block partitions with reference indexes from the second dedup map to produce a transformed previously accepted block; and communicate the transformed previously accepted block over the blockchain network to the requesting peer node.

19. The system of claim 18, wherein the second dedup map is smaller than the first dedup map.

20. A computer program product for data deduplication in a blockchain network, the computer program product comprising a computer readable storage medium having program instructions embodied therewith, the program instructions executable by one or more processors to cause the one or more processors to:

split a new block for a distributed ledger into a plurality of partitions;

compare the plurality of partitions to data in a deduplication (dedup) map, and in response, adding new data from the plurality of partitions to the dedup map;

replace a first partition of the plurality of partitions with a first reference from the dedup map to produce a transformed block;

communicate the transformed block via a network interface to one or more peers; and in response to a new user joining the blockchain network or a crashed peer rebooting, receive a request for a copy of a distributed ledger from a requesting peer node, the distributed ledger comprising a plurality of previously accepted blocks, and in response:

split one of the plurality of previously accepted blocks into a plurality of previously accepted block partitions;

compare the plurality of previously accepted block partitions to a deduplication (dedup) map;

replace at least some of the previously accepted block partitions with reference indexes from the dedup map to produce a transformed previously accepted block; and communicate the transformed previously accepted block over the blockchain network to the requesting peer node.

\* \* \* \* \*